(12) United States Patent
Suyama et al.

(10) Patent No.: US 11,050,582 B2
(45) Date of Patent: *Jun. 29, 2021

(54) CONTROL TERMINAL AND METHOD OF CONTROLLING DEVICE

(71) Applicant: YAMAHA CORPORATION, Hamamatsu (JP)

(72) Inventors: Akihiko Suyama, Hamamatsu (JP); Kazuya Mushikabe, Hamamatsu (JP); Keisuke Tsukada, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/831,835

(22) Filed: Dec. 5, 2017

(65) Prior Publication Data

US 2018/0097654 A1   Apr. 5, 2018

Related U.S. Application Data

(63) Continuation of application No. PCT/JP2016/078006, filed on Sep. 23, 2016.

(30) Foreign Application Priority Data

Sep. 30, 2015   (JP) .............................. JP2015-194506

(51) Int. Cl.
*H04L 12/28*   (2006.01)
*H04H 20/63*   (2008.01)
(Continued)

(52) U.S. Cl.
CPC ......... *H04L 12/2834* (2013.01); *H04H 20/63* (2013.01); *H04L 12/281* (2013.01);
(Continued)

(58) Field of Classification Search
CPC ............. H04L 12/2834; H04L 12/2809; H04L 12/281; H04L 12/2812; H04L 12/282;
(Continued)

(56) References Cited

U.S. PATENT DOCUMENTS 5,692,058 A   11/1997   Eggers et al.
7,571,014 B1   8/2009   Lambourne et al.
(Continued)

FOREIGN PATENT DOCUMENTS

EP   2766905 A1   8/2014
EP   2866152 A1   4/2015
(Continued)

OTHER PUBLICATIONS

Office Action issued in U.S. Appl. No. 15/831,695 dated Jun. 12, 2018.
(Continued)

*Primary Examiner* — Philip J Chea
*Assistant Examiner* — Hassan A Khan
(74) *Attorney, Agent, or Firm* — Rossi, Kimms & McDowell LLP

(57) ABSTRACT

A control terminal and a method of controlling thereof, include receiving and group setting tasks or steps. The receiving task/step receives a selection of a first device, from among a plurality of devices, and a group setting operation for the first device. The group setting task/step, when the first device was previously selected, receives a first client selection of at least a second device, from among the plurality of devices, as a client, and generates a group setting that includes the first device and the at least the second device.

20 Claims, 18 Drawing Sheets

(51) Int. Cl.
*H04N 21/422* (2011.01)
*H04N 21/43* (2011.01)
*H04N 21/436* (2011.01)
*H04N 21/485* (2011.01)
*H04N 21/81* (2011.01)
*H04R 27/00* (2006.01)
*H04R 3/12* (2006.01)

(52) U.S. Cl.
CPC ........ *H04L 12/282* (2013.01); *H04L 12/2809* (2013.01); *H04L 12/2812* (2013.01); *H04N 21/42208* (2013.01); *H04N 21/42224* (2013.01); *H04N 21/4307* (2013.01); *H04N 21/43615* (2013.01); *H04N 21/4852* (2013.01); *H04N 21/8106* (2013.01); *H04R 27/00* (2013.01); *H04L 2012/2841* (2013.01); *H04R 3/12* (2013.01); *H04R 2227/005* (2013.01)

(58) Field of Classification Search
CPC ........... H04L 2012/2841; H04H 20/63; H04N 21/42208; H04N 21/42224; H04N 21/4307; H04N 21/43615; H04N 21/4852; H04N 21/8106; H04R 27/00; H04R 3/12
See application file for complete search history.

(56) References Cited

U.S. PATENT DOCUMENTS

| | | | |
|---|---|---|---|
| 8,290,603 | B1 | 10/2012 | Lambourne |
| 9,042,556 | B2 | 5/2015 | Kallai et al. |
| 9,137,602 | B2 | 9/2015 | Mayman et al. |
| 2003/0023331 | A1* | 1/2003 | Komura ................ H04S 1/00 700/94 |
| 2005/0069153 | A1 | 3/2005 | Hall et al. |
| 2007/0038999 | A1* | 2/2007 | Millington ............ G06F 1/00 718/100 |
| 2007/0214229 | A1* | 9/2007 | Millington ............ H04L 69/28 709/208 |
| 2008/0075295 | A1* | 3/2008 | Mayman ............... G06F 13/36 381/79 |
| 2012/0099594 | A1* | 4/2012 | Lau .................... H04N 21/443 370/392 |
| 2013/0014015 | A1* | 1/2013 | Lambourne ........... G06F 3/165 715/716 |
| 2013/0243199 | A1* | 9/2013 | Kallai .................. A61C 7/30 381/17 |
| 2013/0331970 | A1* | 12/2013 | Beckhardt ............ G06F 3/165 700/94 |
| 2013/0343566 | A1 | 12/2013 | Triplett et al. |
| 2014/0010515 | A1* | 1/2014 | Lee ..................... H04L 65/605 386/207 |
| 2014/0273859 | A1* | 9/2014 | Luna .................... H04W 4/80 455/41.3 |
| 2014/0310597 | A1* | 10/2014 | Triplett ............... G06F 3/04883 715/716 |
| 2015/0113564 | A1 | 4/2015 | Mushikabe |
| 2016/0291925 | A1 | 10/2016 | Kohara |
| 2018/0020308 | A1* | 1/2018 | Lai ...................... G06F 3/165 |

FOREIGN PATENT DOCUMENTS

| | | |
|---|---|---|
| JP | H11502070 A | 2/1999 |
| JP | 2003264895 A | 9/2003 |
| JP | 2013251594 A | 12/2013 |
| JP | 2014042286 A | 3/2014 |
| JP | 2015002357 A | 1/2015 |
| JP | 2015100085 A | 5/2015 |
| WO | 2015076273 A1 | 5/2015 |

OTHER PUBLICATIONS

Extended European Search Report issued in European Appln. No. 16851359.6 dated Feb. 12, 2019.
Office Action issued in U.S. Appl. No. 15/831,695 dated Jan. 22, 2019.
International Search Report issued in Intl. Appln. No. PCT/JP2016/078006 dated Dec. 20, 2016. English translation provided.
Written Opinion issued in Intl. Appln. No. PCT/JP2016/078006 dated Dec. 20, 2016.
Copending U.S. Appl. No. 15/831,695, filed Dec. 5, 2017.
International Search Report issued in Intl. Appln. No. PCT/JP2016/078007 dated Dec. 27, 2016. English translation provided.
Written Opinion issued in Intl. Appln. No. PCT/JP2016/078007 dated Dec. 27, 2016.
Office Action issued in Chinese Appln. No. 201680054710.X dated Sep. 18, 2019. English translation provided.
Office Action issued in European Appln. No. 16851359.6 dated Oct. 15, 2019.
Extended European Search Report issued in European Appln. No. 16851360.4 dated May 13, 2019.
Summons to attend oral proceedings pursuant to Rule 115(1) EPC issued in European Appln. No. 16851359.6 dated Feb. 12, 2020.
Summons to attend oral proceedings pursuant to Rule 115(1) EPC issued in European Appln. No. 16851359.6 dated Jun. 9, 2020.
Office Action issued in Chinese Appln. No. 201680054710.X dated Jun. 17, 2020. English translation provided.

* cited by examiner

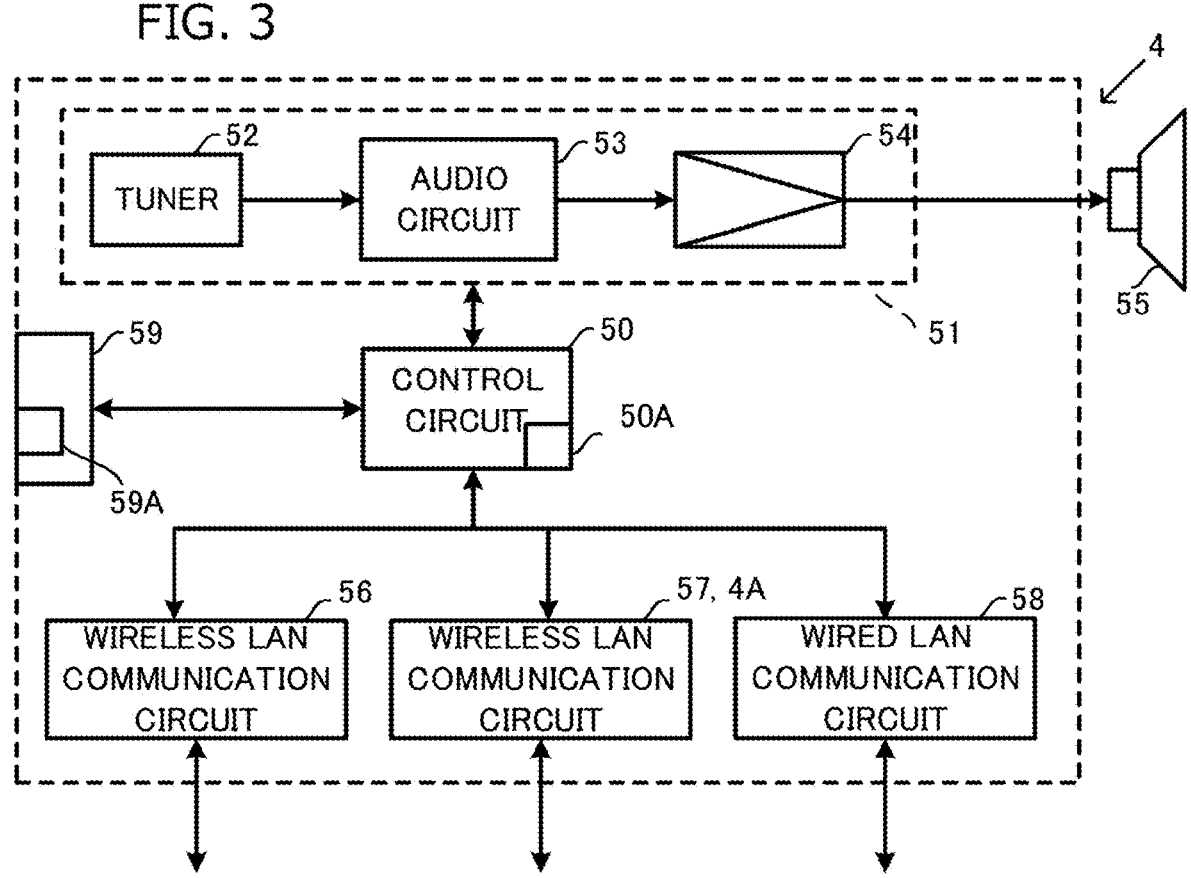

FIG. 4    SYSTEM MANAGEMENT TABLE
DEVICE LIST / AP LIST

| | DEVICE ID | MAC ADDRESS | IP ADDRESS | NUMBER OF HOPS | AP START | NUMBER OF CHILDREN |
|---|---|---|---|---|---|---|
| SYSTEM ID = 01 | 00 | xx-xx-xx-xx-xx-xx yy-yy-yy-yy-yy-yy | 192.168.0.1 192.168.1.1 | 0 (ROOT) | YES | 2 |
| | 01 | xx-xx-xx-xx-xx-xx yy-yy-yy-yy-yy-yy | 192.168.0.2 192.168.1.2 | 1 (NODE) | YES | 1 |
| | 02 | xx-xx-xx-xx-xx-xx yy-yy-yy-yy-yy-yy | 192.168.0.3 192.168.1.3 | 1 (NODE) | NO | 1 |
| | 03 | xx-xx-xx-xx-xx-xx yy-yy-yy-yy-yy-yy | 192.168.0.4 192.168.1.4 | 2 (LEAF) | NO | 0 |
| | 06 | xx-xx-xx-xx-xx-xx yy-yy-yy-yy-yy-yy | 192.168.0.6 192.168.1.6 | 99 (BRANCH) | NO | 0 |
| | EXTERNAL ACCESS POINT INFORMATION | SSID | PASS PHRASE | SECURITY TYPE | | BSSID |

FIG. 5

AUDIO CONTROL TABLE

| | DEVICE ID | IP ADDRESS | MODEL | INSTALLATION LOCATION (ROOM ID) | GROUP | SERVICE | VARIOUS SETTING INFORMATION |
|---|---|---|---|---|---|---|---|
| SYSTEM ID = 01 | 00 | 192.168.0.1 | AV RECEIVER | LIVING ROOM | 1A | NET RADIO | *** |
| | 01 | 192.168.0.2 | PLAYER | DINNING ROOM | 1B | CD, NET DELIVERY RADIO | *** |
| | 02 | 192.168.0.3 | PLAYER | BED ROOM | 1B | CD, NET DELIVERY RADIO | *** |
| | 03 | 192.168.0.4 | SPEAKER | KITCHEN | — | RADIO | |
| | 06 | 192.168.0.6 | SPEAKER | ROOM B | — | *** | *** |

FIG. 6

ROOM TABLE

| ROOM ID | ROOM NAME | BACKGROUND IMAGE |
|---------|-----------|------------------|
| A1 | OFFICE | XXXX.jpg |
| A2 | DINNING ROOM | XXXX.jpg |
| A3 | BED ROOM | XXXX.jpg |
| A4 | LIVING ROOM | XXXX.jpg |
| A5 | KITCHEN | XXXX.jpg |
| A6 | ROOM A | XXXX.jpg |

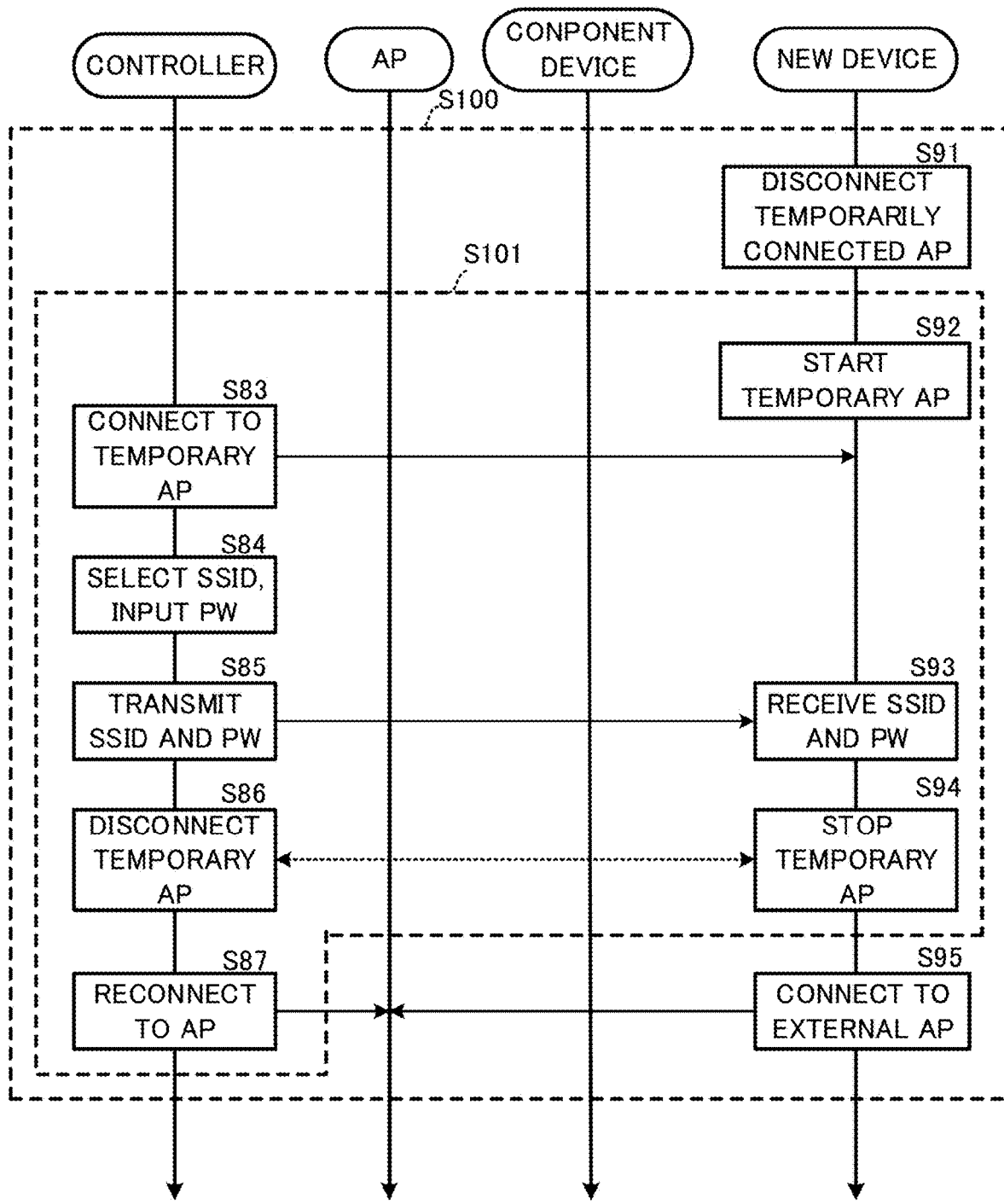

→ TO FIRST GROUP SETTING

FIG. 11D → TO SECOND GROUP SETTING

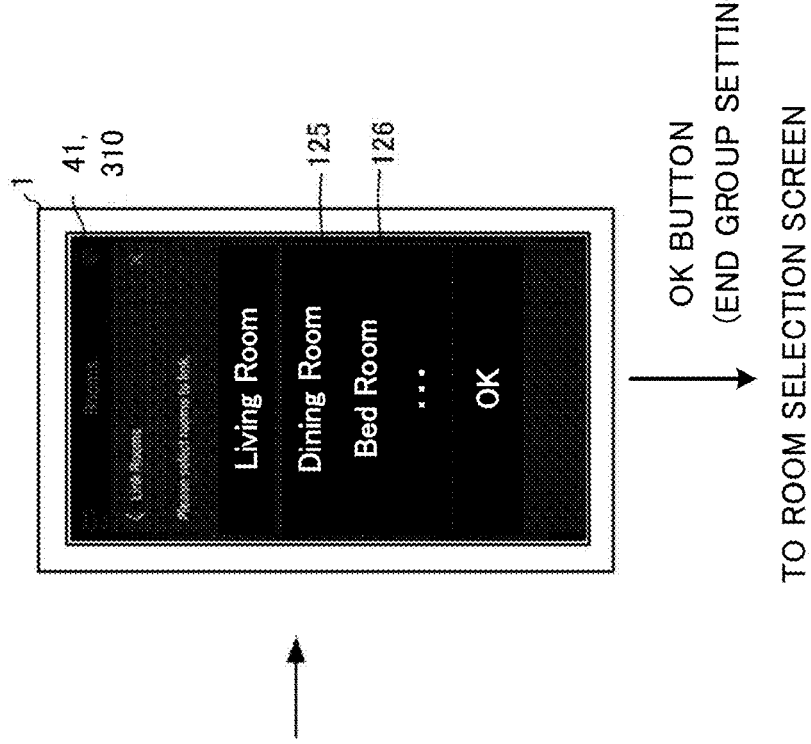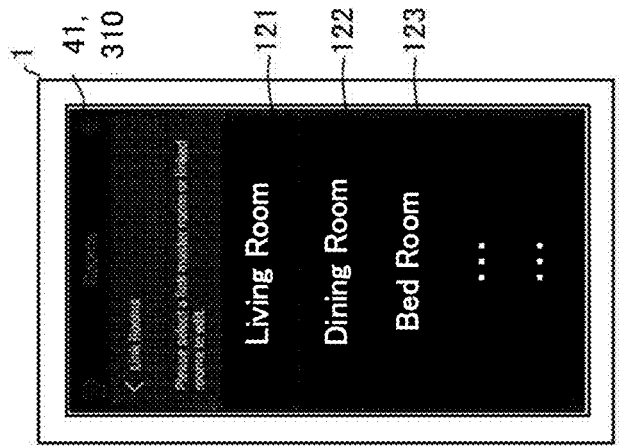

LINK BUTTON → TO GROUP CHANGE SETTING

GROUP CHANGE SETTING

OK BUTTON
(END CHANGE SETTING)

TO PLAY SCREEN

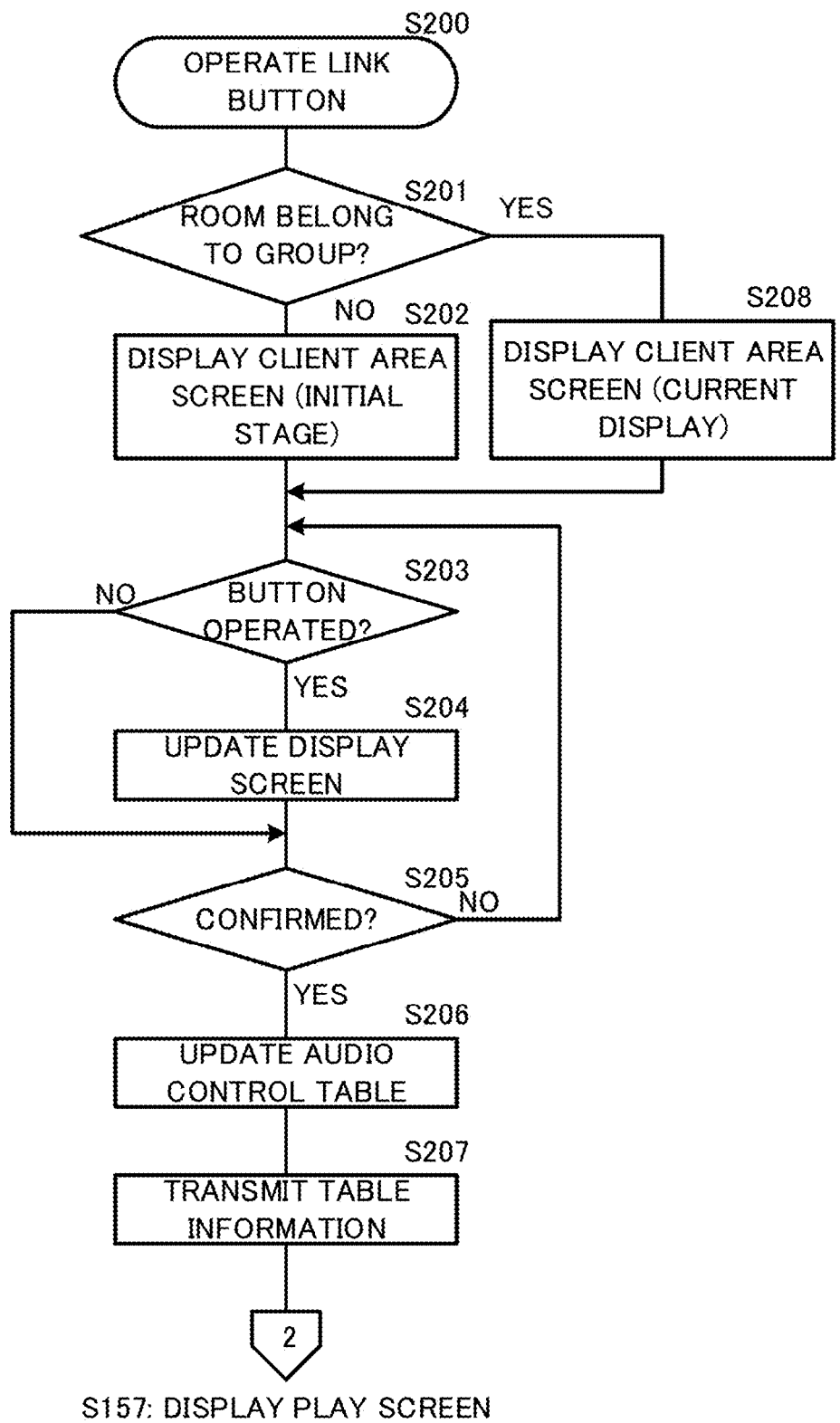

CONTROL TERMINAL AND METHOD OF CONTROLLING DEVICE

CROSS REFERENCE TO RELATED APPLICATIONS

The present application is a continuation application of International Patent Application No. PCT/JP2016/078006, filed on Sep. 23, 2016, which claims priority to Japanese Patent Application No. 2015-194506, filed on Sep. 30, 2015. The contents of these applications are incorporated herein by reference in their entirety.

BACKGROUND OF THE INVENTION

1. Field of the Invention

The present invention relates to a control terminal and a method where two or more devices are grouped for a synchronized operation.

2. Description of the Related Art

In recent years, a portable terminal device is configured to control an operation, such as content playing, of each audio device in an audio system with a plurality of audio devices (playing devices) arranged in each room (area), such as a living room and a bedroom, connected to a network (wireless network, in particular). See Japanese Unexamined Patent Application Publication No. 2013-251594, for example.

The user, by operating the portable terminal device, can cause one selected audio device to execute content playing or the like. In addition, the user, by operating the portable terminal device, can also specify (select) a plurality of audio devices to perform group setting. Then, the user can also cause the audio devices that belong to a group to synchronously play the same content.

In the group setting of the above-described audio system, it is necessary to select a master device as a supply source of content that is synchronously played, and a client device that receives the content from the master device, making the operation difficult.

SUMMARY OF THE INVENTION

The present invention is directed to allowing a control terminal to more easily perform a group setting, where two or more devices can be grouped for a synchronized operation.

One aspect of the present invention is a control terminal includes at least one memory storing instructions and at least one processor configured to implement the stored instructions and execute a plurality of tasks. The at least one processor executes a receiving task and a group setting task. The receiving task receives a selection of a first device, from among a plurality of devices, and a group setting operation for the first device. The group setting task, when the first device was previously selected, receives a first client selection of at least a second device, from among the plurality of devices, as a client, which causes the first device to be set as a master, and generates a first group setting that includes the first device and the at least second device.

The first client selection includes at least one of any previously selected device as the client, which synchronizes with the master, or the at least second device that was not previously selected as the client, in association with the first device as the master.

Another aspect is a method of controlling at least one device of an audio system that provides corresponding steps.

The present features allow a user to more easily perform the group setting of devices for synchronous operation.

The above and other elements, features, characteristics, and advantages of the present invention will become more apparent from the following detailed description with reference to the attached drawings.

BRIEF DESCRIPTION OF THE DRAWINGS

FIG. 3 is a block diagram of an audio device.
FIG. 4 illustrates an example of a system management table for setting to a host device and a controller.
FIG. 5 illustrates an example of an audio control table set to the controller.
FIG. 6 illustrates an example of a room table set to the controller.
FIG. 10 is a diagram illustrating a communication procedure of the controller and the audio device.
FIG. 11D illustrates an example of a control screen (play screen) of the portable phone.
FIG. 12A illustrates an example of a control screen (master room selection screen) of the portable phone.
FIG. 12B illustrates an example of a control screen (client room selection screen) of the portable phone.
FIG. 18 is a flow chart illustrating second group setting and a group change setting process of the controller (control circuit).

DETAILED DESCRIPTION

Figure 1:
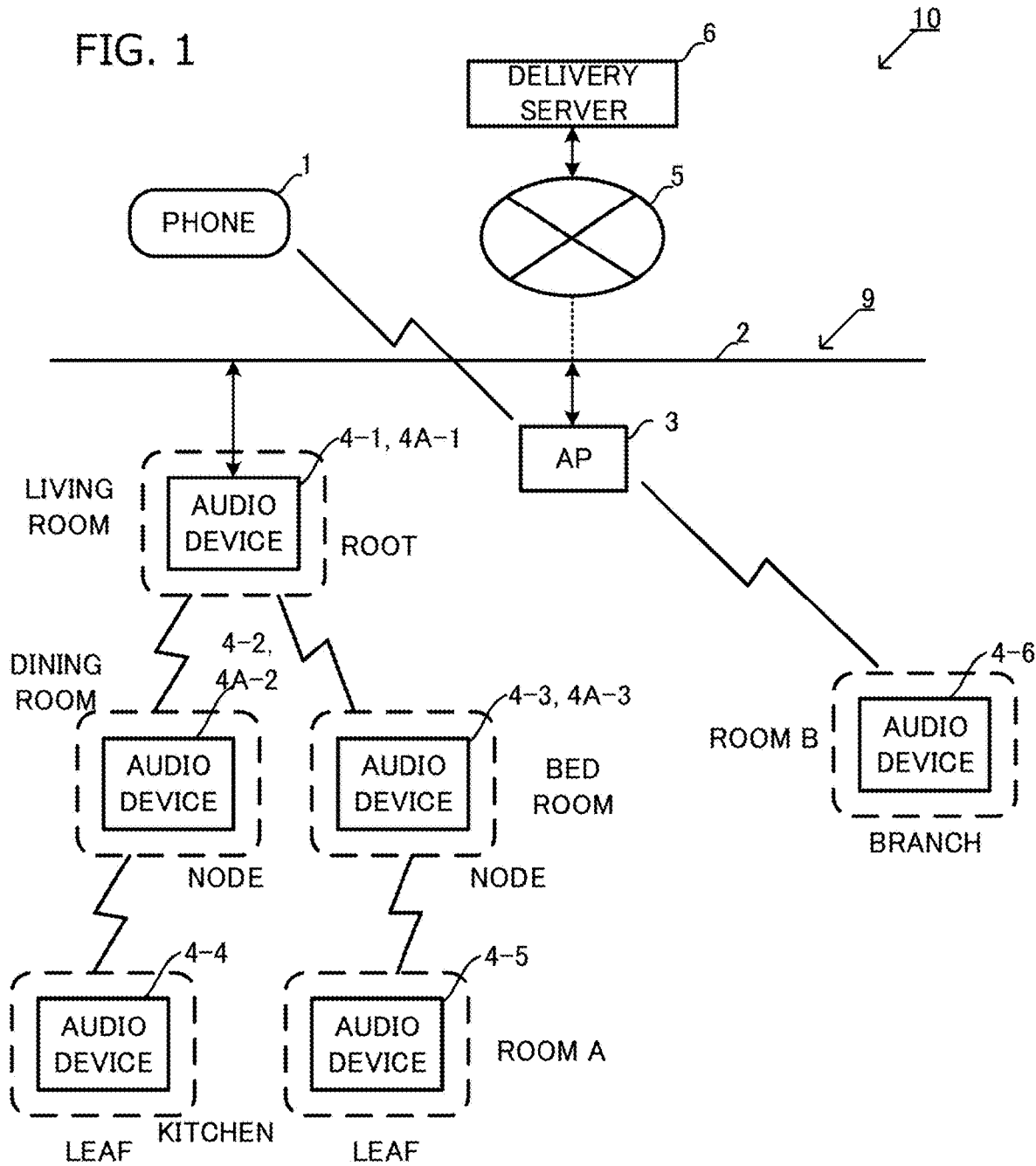
FIG. 1 is a configuration diagram of an audio system.

FIG. 1 is a diagram illustrating a configuration of an audio system 10 having a plurality of audio devices 4 (4-1, 4-2, 4-3, 4-4, 4-5, and 4-6) and a multifunctional portable phone (portable terminal device) 1. The plurality of audio devices 4 (4-1 to 4-6) and the portable terminal devices 1 are connected in a network 9 including a wired LAN 2 and an access point (external access point) 3. The portable terminal device 1 is a control terminal that functions as a controller.

Each of the audio devices 4 transmits and receives an audio signal mutually through the network 9. The controller or portable terminal device 1 transmits a command message to each of the audio devices 4 through the network 9.

Each of the audio devices 4 (hereinafter also referred to as a component device) has a wired LAN function and two wireless LAN functions, including a first wireless LAN function and a second wireless LAN function. Each of the audio devices 4 can start an access point using the first wireless LAN function of the two wireless LAN functions. The access point started by each of the audio devices 4 is called an internal access point 4A. The internal access point 4A is connected to one of lower-level audio devices 4. The internal access point 4A usually (except the time of an initial connection to be described later) operates in a stealth mode, and the presence of the internal access point 4A is hardly known to other devices. The wireless LAN function of the second wireless LAN function functions as a slave machine of the wireless LAN, and is connected to the internal access point 4A of one of higher-level audio devices 4 or an external access point 3.

The wired LAN 2 is connected to the access point (external access point) 3. The audio device 4-1 is connected to the wired LAN 2 with a cable. The audio device 4-2 and the audio device 4-3 are connected to an internal access point 4A-1 of the higher-level audio device 4-1 by the wireless LAN. The audio device 4-4 is connected to an internal access point 4A-2 of the higher-level audio device 4-2 by the wireless LAN. In addition, the audio device 4-5 is connected to an internal access point 4A-3 of the higher-level audio device 4-3 by the wireless LAN. The audio device 4-6 is connected to the external access point 3.

The network 9 can be configured by the wired LAN 2, and the wireless LAN including the internal access point 4A and the external access point 3. The wired LAN 2 can use, for example, Ethernet (registered trademark: IEEE 802.3). The wireless LAN can use Wi-Fi (registered trademark: IEEE 802.11g). Moreover, the network 9 can be connected from the wired LAN 2 to a delivery server 6 through the gateway and the Internet 5. The delivery server 6 can deliver music data to the audio devices 4.

Each of the audio devices 4 is called a root device, a node device, a leaf device, and a branch device, according to the configuration of the connection to the wired LAN 2. The root device is the top-level device connected to the wired LAN 2 directly (with a cable). The audio device 4-1 is a root device in FIG. 1. The root device is an audio device that is first registered at the time of the configuration of the audio system 10, and serves as a reference point of the audio system 10. The root device starts the internal access point 4A to connect the lower-level audio devices 4 to the network and causing the lower-level audio devices 4 to participate in the audio system 10. The music information reproduced by the audio devices 4 (a node device and a leaf device) connected below the root device is all transmitted through the root device.

The node device is a middle-level device connected to the root device (internal access point 4A of the root device) by the wireless LAN, and the audio device 4-2 and the audio device 4-3 are node devices in FIG. 1. The node device starts the internal access point 4A to connect the lower-level audio devices 4 to the network and causes the lower-level audio devices 4 to participate in the audio system 10. The music information reproduced by the audio devices 4 (a leaf device) connected to a device below the node device is all transmitted through the node device.

The leaf device is a lower-level device connected to the node device (internal access point 4A of the node device) by the wireless LAN, and the audio device 4-4 and the audio device 4-5 are a leaf device in FIG. 1. It is to be noted that, while the leaf device does not start the internal access point 4A in the present example, the leaf device can be set to start the internal access point 4A.

The branch device is connected to the external access point 3 by the wireless LAN, separately from a tree having a root device as the top. The branch device is one of the audio devices 4 that communicates with other audio devices 4 in the audio system 10 through the wired LAN 2, and the audio device 4-6 is a branch device in FIG. 1. It is to be noted that, while the branch device does not start the internal access point 4A in the present example, the branch device can be set to start the internal access point 4A.

In such an audio system, to transmit a high quality audio signal, the root device is allowed to connect up to two node devices. In addition, each of the node devices is allowed to connect up to two leaf devices. The hierarchy of connection using the internal access point 4A is up to (less than or equal to) three hierarchies of a root device to a node device to a leaf device. Therefore, the tree of a wireless LAN including a root device as the top makes it possible to connect up to seven (or less) audio devices, including the root device. The tree illustrated in FIG. 1 is connected to five audio devices 4 (4-1 to 4-5). Although there is no limitation in the number of branch devices, as a controlled target of the controller 1, the number of audio devices 4 can be limited to up to ten (or less) audio devices 4 in the entire audio system 10. But the maximum number, such as the number of hierarchies of a tree and the number of lower-level devices connectable to each of the audio devices 4, is not limited thereto.

In addition, each of the audio devices 4-1 to 4-6, as illustrated in FIG. 1, is arranged in each room (area) of a living room, a dining room, a bedroom, a kitchen, a room A, and a room B that are in the same building.

Each of the audio devices 4-1 to 4-6 of the audio system 10 is able to independently play different content. But in the audio system 10, a plurality of audio devices 4-1 to 4-6 can be grouped. The grouped audio devices 4-1 to 4-6 can synchronously play the same content. The content can be music (audio), for example. The music can be music data stored in a CD, a hard disk, or the like included in each of the audio devices 4-1 to 4-6. The file format of the music data can be MP3, WAV, SoundVQ (registered trademark), WMA (registered trademark), or AAC, for example.

Figure 2:
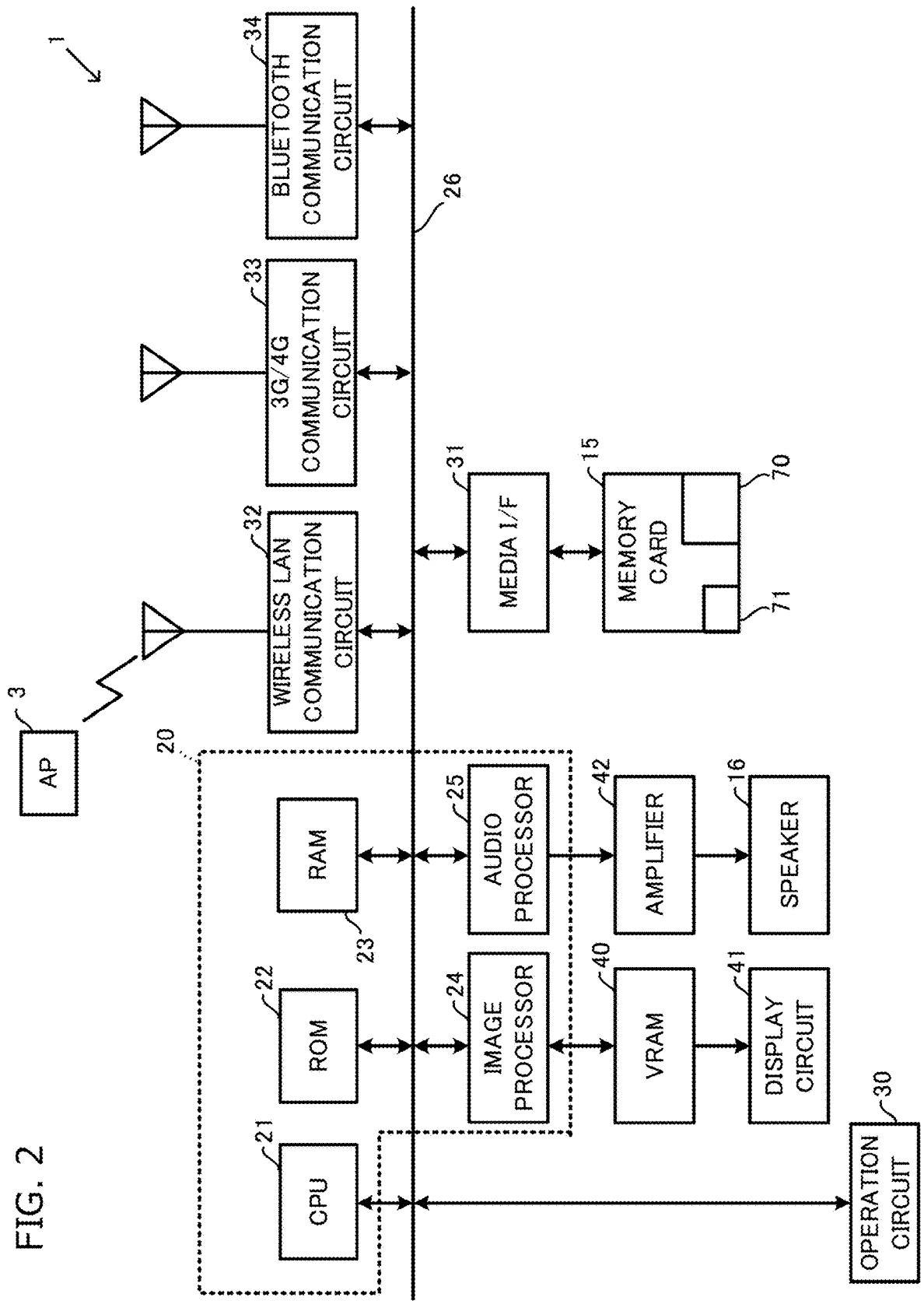
FIG. 2 is a block diagram of the portable phone that functions as a controller.

The portable phone 1 functions as an audio system controller (hereinafter referred to as a controller) by starting an audio system control program 70 (see FIG. 2). The portable phone 1 (controller 1) communicates with each of the audio devices 4 that belongs to the audio system 10, through the network 9. The controller 1, through such communication, controls an audio source to be played in each of the audio devices 4-1 to 4-6 in the audio system 10 (which of the audio devices 4 plays which music, which music is delivered to which of the audio devices 4, or the like, for example) and the sound volume, and the like, in an integrated manner. Moreover, each of the audio devices 4 can communicate with other audio devices 4 through the network 9, and mutually transmit and receives an audio signal.

In addition, the controller 1 receives an operation input to set a group that performs the synchronous playing. The group can be set up per room (area). Then, the controller 1 can allow the audio devices 4 arranged in a room belonging to the group to perform synchronous playing.

Subsequently, with reference to the block diagram in FIG. 2, a description will be made of a configuration of a portable phone 1. The portable phone 1 is a multifunctional telephone known as a smartphone. The portable phone 1 can have a 3G/4G communication function that is a portable communication network, a wireless LAN (Wi-Fi) communication function, and a Bluetooth (registered trademark) communication function. The portable phone 1, by starting the audio system control program 70 (application program), functions as a controller. The portable phone 1 communicates with the audio devices 4 of the audio system through the network, transmits a command message according to the operation of a user, to the audio devices 4, and controls the audio system.

The portable phone 1, on a bus 26, has a control circuit 20, an operation circuit 30, a media interface 31, a Wi-Fi communication circuit 32, a 3G/4G communication circuit 33, and a Bluetooth (registered trademark) communication circuit 34. The control circuit 20 includes a CPU 21, a ROM (flash memory) 22, a RAM 23, an image processor 24, and an audio processor 25. The image processor 24 is connected to a video RAM (VRAM) 40, and the VRAM 40 is connected to a display circuit 41. The display circuit 41 includes a display of liquid crystal. The display displays a standby screen, a telephone number, and the like. When functioning as the controller 1, the display circuit 41 displays a screen for controlling the audio devices 4. The audio processor 25 is connected to an amplifier 42 including a D/A converter, and the amplifier 42 is connected to a speaker 16.

The image processor 24 is provided with a GPU (Graphics Processing Circuit) that generates various images such as a standby screen and a telephone number. The image processor 24, when the audio system control program 70 is started, generates the image of an audio controller according to instruction of the CPU 21, and develops the image on the VRAM 40. The image developed on the VRAM 40 is displayed on the display circuit 41.

The audio processor 25 has a DSP (Digital Signal Processor) that encodes and decodes telephone call sound. The audio processor 25 outputs decoded or generated sound to the amplifier 42. The amplifier 42 amplifies the sound signal and outputs a resulting sound signal to the speaker 16.

The wireless LAN communication circuit 32 performs wireless communication with the access point 3 in conformity with IEEE 802.11g standard, and communicates with the audio devices 4 through the access point 3. The 3G/4G communication circuit 33 performs voice communication and data communication through a portable telephone communication network. The Bluetooth communication circuit 34 communicates with other Bluetooth compatible devices to transmit and receive an audio signal.

The operation circuit 30 includes a touch panel 310 (mainly see FIG. 11A to FIG. 11D) that is formed on the display circuit 41, to provide a user interface. The operation circuit 30 detects a touch operation and a flick operation on the touch panel 310. When the audio system control program 70 is started, a plurality of operation elements such as a setup button and a scan button are displayed on the display circuit 41. The operation circuit 30 detects the touch operation of a user and the coordinates of the operation by the touch panel 310, and determines which operation element has been operated.

The media interface 31 is connected to a memory card 15. The memory card 15 can be a micro SD card, for example. The audio system control program 70 can be stored in the memory card 15 or the ROM 22. In the present example, as illustrated in FIG. 2, the audio system control program 70 is stored in the memory card 15. It is to be noted that the audio system control program 70 can be downloaded through the 3G/4G data communication or the wireless LAN data communication or can be stored in advance in the ROM 22 or the memory card 15. In addition, the memory card 15 can include a storage area 71 that stores the configuration of the audio system.

The ROM 22 stores a basic program for executing a telephone call and an application program of the portable phone 1. The ROM 22 is a flash memory, and besides the basic program, can store an application program that has been downloaded. The RAM 23 has a work area that is used when the CPU 21 executes the audio system control program 70. The control circuit 20, when the CPU 21 executes the audio system control program 70, functions as a selection circuit, and receives the operation input to set a group that performs synchronous playing.

The selection circuit and the control circuit 20 can be executed by a processing circuit, such as a CPU (Central Processing Unit) or a DSP (Digital Signal Processing).

Subsequently, a description will be made of a configuration of one of the audio devices 4 with reference to FIG. 3. The one of the audio devices 4 has a control circuit 50, an audio processing circuit 51, an operation circuit 59, a wireless LAN communication circuit (RF module) 56, a wireless LAN communication circuit 57, and a wired LAN communication circuit 58. The operation circuit 59 has a connect button 59A in addition to a volume operation element. The control circuit 50 includes a CPU and a memory and stores an audio system program. The control circuit 50, by the audio system program, controls the operation of the audio processing circuit 51, the wireless LAN communication circuit 56, the wireless LAN communication circuit 57, and the wired LAN communication circuit 58. Accordingly, the audio devices 4 can function as a play device that plays content and also as a synchronous play controller to be a master device that controls the synchronous playing. In addition, the control circuit 50, when the connect button 59A is pressed, executes an initial connection operation that is an operation to connect one of the audio devices 4 to the network 9. The details of the initial connection operation will be described below.

The wireless LAN communication circuit 56 performs wireless communication by the wireless LAN standards such as IEEE 802.11g with the external access point 3 or the internal access point 4A of the higher-level audio devices 4. Moreover, the wireless LAN communication circuit 57 is started as an access point (internal access point 4A), and relays other audio devices (audio device 4-2 or audio device 4-3, for example) to the wired LAN 2. Furthermore, the wireless LAN communication circuit 57 is started as a temporary access point for initial connection at the time of initial connection, and communicates with the controller 1 (portable phone 1). The operation at the time of initial connection will be described below. It is to be noted that both the wireless LAN communication circuit 56 and the wireless LAN communication circuit 57 can operate in one piece hardware in a time-sharing manner. The wired LAN communication circuit 58 has a cable connector, and performs communication by the communication standards such as IEEE 802.3 through the wired LAN 2 and the access point 3. The access point 3 is connected to the controller (portable phone) 1, and the control circuit 50, by communicating with the controller 1 through the network 9, transmits an operation state and receives a command message.

The SSID and password of the internal access point 4A are made into a character string that can be found out from the MAC address of the wireless LAN communication circuit 57. For example, the MAC address can be octet expressed as an SSID, and the lower three octets (model ID+serial number) can be used as a password. Accordingly, an audio device to newly participate in the audio system can easily find the internal access point 4A based on the SSID (vendor ID of the MAC address and model ID). Alternatively, an audio device newly participating in the audio system can generate a password by itself, and can connect to the internal access point 4A. Accordingly, an audio device newly participating in the audio system, when connecting to the internal access point 4A, can omit the input of an SSID or a password by a user. It is to be noted that a method of generating an SSID of the internal access point 4A and a password is not limited to the above-described methods.

The audio processing circuit 51 has a tuner 52, an audio circuit 53, and a power amplifier 54. The tuner 52 receives an audio signal from an FM broadcast or the Internet, and inputs the audio signal into the audio circuit 53. The audio circuit 53 performs an audio processing, such as equalizing or volume adjustment to an input audio signal. In addition, the audio circuit 53 outputs a processed audio signal to the power amplifier 54. The power amplifier 54 amplifies the input audio signal, and outputs an amplified audio signal to a speaker 55 that is connected externally. The speaker 55 emits the input audio signal as sound.

It is to be noted that the audio devices 4-1 to 4-6 can be different devices, respectively. The basic configuration of a communication function and an audio signal processing function is illustrated in FIG. 3.

FIG. 4 and FIG. 5 each illustrate an example of a table that manages the audio system 10. FIG. 4 is a system management table that manages the connection configuration of each of the audio devices 4 in the network 9. FIG. 5 is an audio control table that manages the operation of each of the audio devices 4 in the audio system 10. The system management table can be used mainly by the audio device 4-1 to be a root device to manage network connection. In addition, the audio control table is used, mainly by the controller 1, to control the play of an audio source.

The system management table stores the connection configuration of each of the audio devices 4 (a component device) configuring the audio system 10, and can be created by the controller 1 at the time of configuration of the audio system 10. In addition, when a new one of the audio devices 4 is added to the audio system 10, the controller 1 updates the system management table by adding the new one of the audio devices 4. The system management table that has been created or added and updated is transmitted from the controller 1 to the audio device 4-1 to be a root device. Then, the system management table, during the operation of the audio system 10, is updated by the audio device 4-1 used as a root device every time the disconnection or the reconnection of any of the component devices occurs. Furthermore, the audio device 4-1 used as a root device periodically transmits all or a part of the details of the system management table as system information to each of the component devices and the controller 1. Accordingly, each of the component devices and the controller 1 are always able to store the latest system information. The detailed operation of transmission of the above system information will be described below.

The system management table is identified by a system ID for identifying the audio system 10. The system management table associates each of the component devices with a device ID one-on-one, and stores information such as the higher-level side (slave machine side) and lower-level side (internal access point side) MAC address (that is, the MAC address of each of the wireless LAN communication circuits 56 and 57), the higher-level side and lower-level side IP address (that is, the IP address of each of the wireless LAN communication circuits 56 and 57), the number of connection stages (the number of HOPs) from the audio device 4-1 used as a root device, the presence or absence of start of an internal access point, or the number of lower-level devices (the number of children) connected to the internal access point 4A.

It is to be noted that, while each of the component devices has an individual IP address, the audio system 10 has a multicast address that is set up as a multicasting group. Each of the component devices, by transmitting an IP packet of the system information to the multicast address, is able to cause all the component devices of the audio system 10 to receive a system information packet. It is to be noted that each of the component devices can transmit the system information packet to the IP address of each of the component devices by unicast. In addition, each of the component devices, by transmitting the system information packet to the IP address of each of the component devices by multicast, is able to reduce the load of the network 9.

The audio control table illustrated in FIG. 5 associates a device with a device ID one-on-one, and stores various types of setting information such as the higher-level side IP address (the IP address of the wireless LAN communication circuit 56) of each of the component devices, a model, an installation location, a group, service, a volume value, and a display name. Each column of the audio control table and each column of the system management table are associated with each other by the device ID. The controller 1 creates a control screen (see FIG. 11A to FIG. 15) based on the details of the audio control table, and receives control of each of the component devices by a user.

The installation location is information that specifies a room (area) where the audio device is installed. Although a name is displayed in FIG. 5, a room ID of a room where a device is installed is registered in the installation location, for example. The information of the installation location (room ID) is set to each of the audio devices 4, for example, when the audio device is installed in a room. The room ID is associated with each piece of information of a room table illustrated in FIG. 6. FIG. 6 illustrates an example of the room table. In the room table, information related to a room where the audio devices 4 are arranged is registered. Specifically, a room name and a background image are associated with a room ID and registered in the room table. The room name is name data of a room such as a living room (Living Room). The background image is an image used as a background image such as a room selection button (area selection image) displayed on the control screen in the portable phone 1. For example, the file name of image data is registered. It is to be noted that the room name and the background image can be optionally set by a user, operating the controller 1.

The group is information of a group to which an audio device (room) belongs, and indicates a group that performs synchronous playing of the above described content. In the illustrated example, only one group is set up. In addition, an audio device that belongs to one group can be set to either a synchronous playing master or a synchronous playing client.

The synchronous playing master takes charge of the supply of an audio source to the entire group and the control of synchronous playing. In addition, the synchronous playing master functions as a device that also performs synchronous playing. The synchronous playing client plays content according to the instruction of the synchronous playing master. For example, "1A" indicated in FIG. 6 indicates an audio playing device (room) that belongs to a group as a synchronous playing master. In addition, "1B" indicates an audio playing device (room) that belongs to a group as a synchronous playing client. The room ID other than "1A" and "1B" indicates an audio playing device that does not belong to a group. The group can set per room (area) by operating the controller 1 as described above. The details will be described below.

The service indicates source information of an FM broadcast or content that each device, such as a CD (CD player), that can be played.

In a case where a user configures the audio system 10, the user first sets the audio device 4-1 used as a root device, and configures the audio system 10. Subsequently, the user adds the audio devices 4 other than the audio device 4-1 used as a root device, to the audio system 10. The user works in the following procedure. The user connects the audio device 4-1 used as a root device, to the wired LAN 2 with a cable. The user starts the controller 1 in a setup mode. The user presses the connect button 59A of the audio device 4-1. When the user performs the above work, the controller 1 and the audio device 4-1 used as a root device communicate with each other to automatically configure the audio system 10. Subsequently, when the user adds a new one of the audio devices 4 to the audio system 10, the user starts the controller 1 in a setup mode, turns on the power of the new one of the audio devices 4 to be added (starts the wireless LAN communication circuits 56 and 57), and presses the connect button 59A. The new one of the audio devices 4, of which the connect button 59A has been pressed, communicates with the controller 1 and the audio device 4-1 used as a root device, automatically generates a password from the above described SSID, and is automatically added to the audio system 10.

With reference to FIG. 7 to FIG. 10, a description will be made of a communication procedure of the controller 1 and one of the audio devices 4 at the time of configuration of the audio system 10 and at the time of addition of a new one of the audio devices 4 to the audio system 10.

Figure 7:
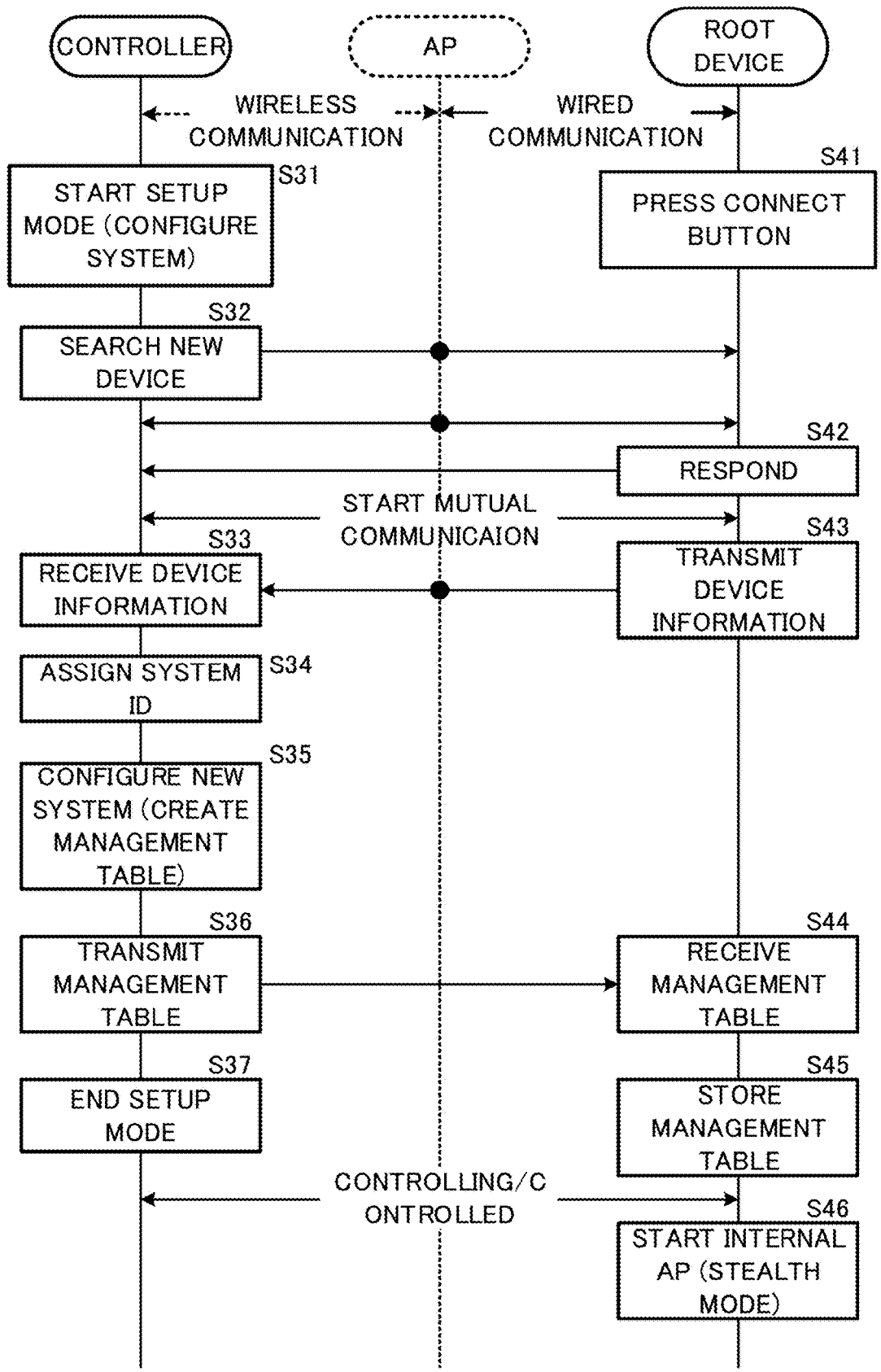
FIG. 7 is a diagram illustrating a communication procedure of the controller and the audio device.

FIG. 7 illustrates a communication procedure of the controller 1 and the audio device 4-1 used as a root device when an audio system 10 is newly configured. The portable phone 1, when the audio system control program 70 is started, functions as a controller 1. When the controller 1 enters a setup mode by the operation of a user (S31), a guide screen to prompt the user to press the connect button 59A of the audio device 4-1 is displayed on the display circuit 41 (display device). The user sees the guide screen and presses the connect button 59A of the audio device 4-1 (S41). Subsequently, the controller 1 searches a new audio device that is connected to the wired LAN 2 (S32). The search is performed by transmitting a message requesting a reply, such as by polling. The audio device 4-1 responds to the search (S42). Accordingly, the controller 1 and the audio device 4-1 start mutual communication through the wired LAN 2 and the access point 3.

The audio device 4-1 transmits its own device information (such as a MAC address or IP address of the wireless LAN communication circuit), to the controller 1 (S43). The controller 1 configures a new audio system 10 where the audio device 4-1 is used as a root device (S33). The controller 1 assigns a system ID to the audio system 10 (S34). The controller 1 creates the system management table and the audio control table that are respectively illustrated in FIG. 4 and FIG. 5, and configures the audio system 10 where one of the audio devices 4 that is currently communicating is used as a root device (S35). When the audio system 10 is configured, the controller 1 transmits the system management table to the audio device 4-1 that is a root device (S36), and ends the setup mode (S37). The audio device 4-1 receives the system management table from the controller 1 (S44) and stores the system management table (S45). Accordingly, the audio system 10 where the audio device 4-1 is used as a root device that is a key component can be configured. Hereinafter, the controller 1 controls music to be played, the volume of the music, and the like. The audio device 4-1 starts an access point in a stealth mode (S46).

Figure 8:
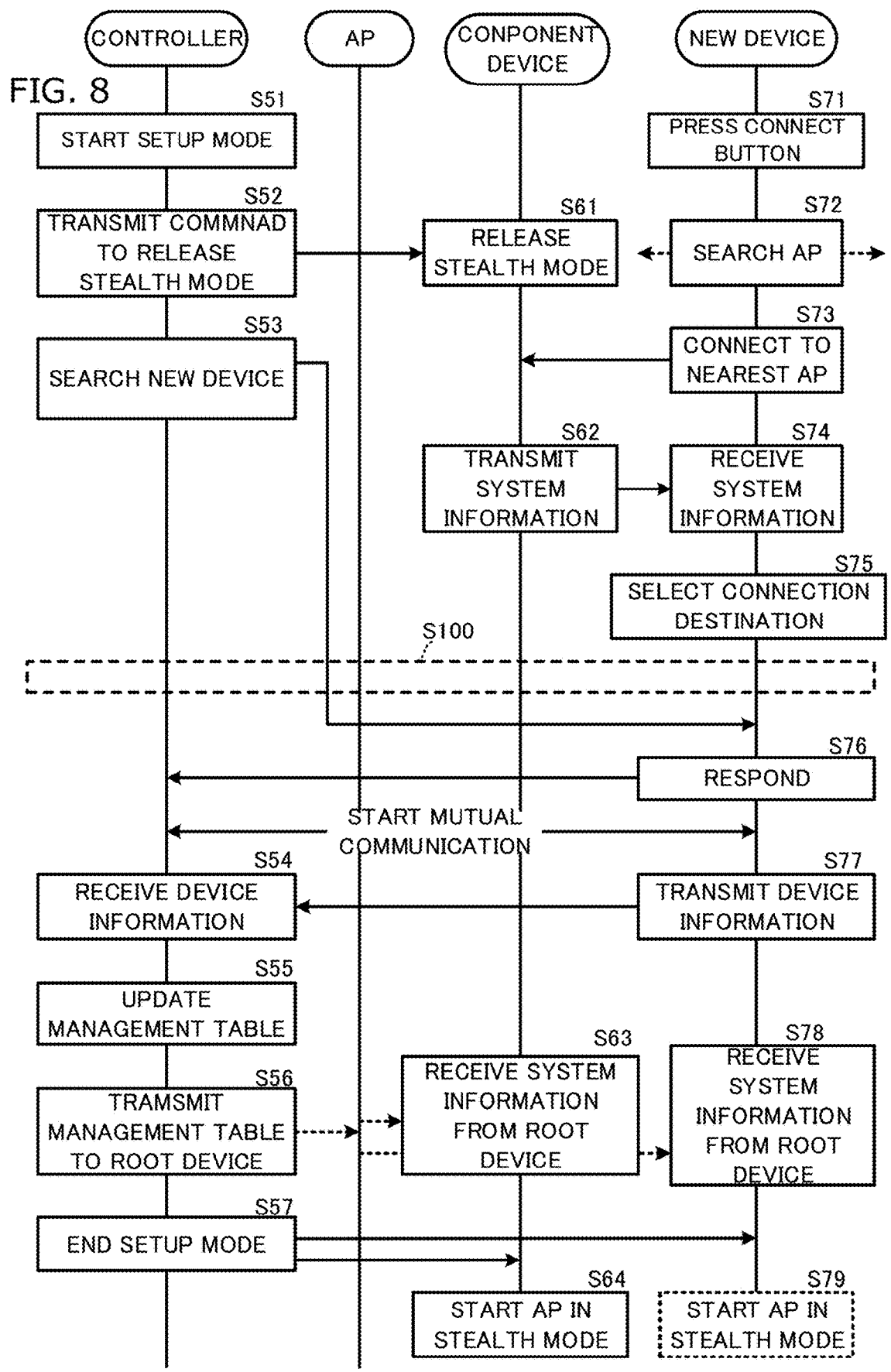
FIG. 8 is a diagram illustrating a communication procedure of the controller and the audio device.

FIG. 8 illustrates a communication procedure in a case where a new audio device is added to the audio system 10 that already has been configured. A component device is one of the audio devices 4 that already has been served as a component of the audio system 10, and, in the present example, is a root device or a node device that has started the internal access point 4A. A new device is one of the audio devices 4 to be newly added.

When the portable phone 1 that functions as the controller enters the setup mode by the operation of the user (S51), a guide screen to prompt the user to press the connect button 59A of one of the audio devices 4 (new device) is displayed on the display circuit 41. The user follows the guide screen and presses the connect button 59A of the new device (S71). The controller 1 can instruct the component device, namely one of the audio devices 4 that has been registered, to release the stealth mode of the internal access point 4A (S52). Accordingly, the component device releases the stealth mode of the internal access point 4A, transmits a beacon frame that indicates the component device itself is present, and enables the new device to passively scan (S61). Subsequently, the controller 1 starts search of a new device (S53).

The new device, when the user presses the connect button 59A (S71), enters an initial connection mode and searches (passively scans) a connectable access point (S72). Through the search, the new device detects the internal access point 4A of a component device as a connectable access point. As described above, the internal access point 4A has an identifiable SSID that makes it possible to identify a device of the audio system 10 when the device is viewed from the new device, generates a password from the SSID (or MAC address), and becomes connectable. The new device selects a nearest internal access point (of which the electric wave strength is strongest and of which the connection is easiest) among the internal access points 4A that the new device has found, and temporarily connects a selected internal access point 4A, using the password generated from the SSID (S73). The connection is temporary connection for obtaining system information, and is not the proper connection for participating in the audio system 10. Then, the new device obtains the current system information of the audio system 10 from the connected internal access point 4A (component device) (S62 and S74). The system information is information that includes all or a part of the details of the system management table, and is periodically updated by the audio device 4-1 used as a root device, and is delivered to other component devices. The new device, based on the obtained system information, selects the most suitable access point in order to participate in the audio system 10 (S75). The selection is performed on the basis of the electric wave strength of each access point, the number of connection stages from the audio device 4-1 used as a root device, or the number of component devices that are connected to each access point, and an access point with a good communication condition (the strong electric wave strength, the fewer number of connection stages, the fewer number of component devices, for example) is selected.

The example of FIG. 8 (example without executing step S100 in FIG. 9) illustrates a flow of a case where the temporarily connected internal access point 4A is determined to be the most suitable for proper connection and a connection destination is not changed. For example, the new device can be connected to the internal access point 4A-1 of the audio device 4-1 used as a root device. Each device, in a case where the connection destination is changed from the temporarily connected internal access point 4A for proper connection, executes the procedure illustrated in FIG. 9 or FIG. 10 in the section of step S100 illustrated in FIG. 8. When the proper connection is completed (in the case of FIG. 8, after the temporary connection is changed to the proper connection), the new device receives a new device search message (S53) from the controller 1, and responds to the new device search message (S76). This enables the new device to communicate with the controller 1. Accordingly, the new device becomes a component of the audio system 10, and the controller 1 starts controlling music that the new device plays and the volume of the music.

The new device transmits own device information (such as a MAC address or IP address of the wireless LAN communication circuit and an installation location), to the controller 1 (S77). The controller 1 receives the device information of the new device (S54), registers the new one of the audio devices 4 in the system management table and the audio control table, and updates both tables (S55). The controller 1 transmits the updated system management table to the audio device 4-1 used as a root device (S56), and ends the setup mode (S57). The audio device 4-1 used as a root device periodically delivers system information including all or a part of the details of the system management table to other component devices as a connection confirmation message. The notification of the end of the setup mode is transmitted from the controller 1 to all the audio devices 4. Alternatively, the controller 1 can transmit the notification of the end of the setup mode to the audio device 4-1 used as a root device, and the audio device 4-1 used as a root device can transmit the notification of the end of the setup mode to other audio devices 4 of the audio system 10.

The new device that has received the system information from the audio device 4-1 used as a root device stores the received system information (S78). Subsequently, the new device starts an internal access point 4A in a stealth mode (S79). In addition, the component device that has received the system information from the audio device 4-1 used as a root device updates the system information stored inside with the received system information (S63). Then, the component device returns the mode of the internal access point 4A to the stealth mode (S64). By the above processes, the user can add a new device to the audio system 10 that has already been configured. It is to be noted that a device where the component device and the new device configure the internal access point 4A in the stealth mode is a root device or a node device, and the processes in steps S64 and S79 are not performed in a leaf device and a branch device.

Figure 9:
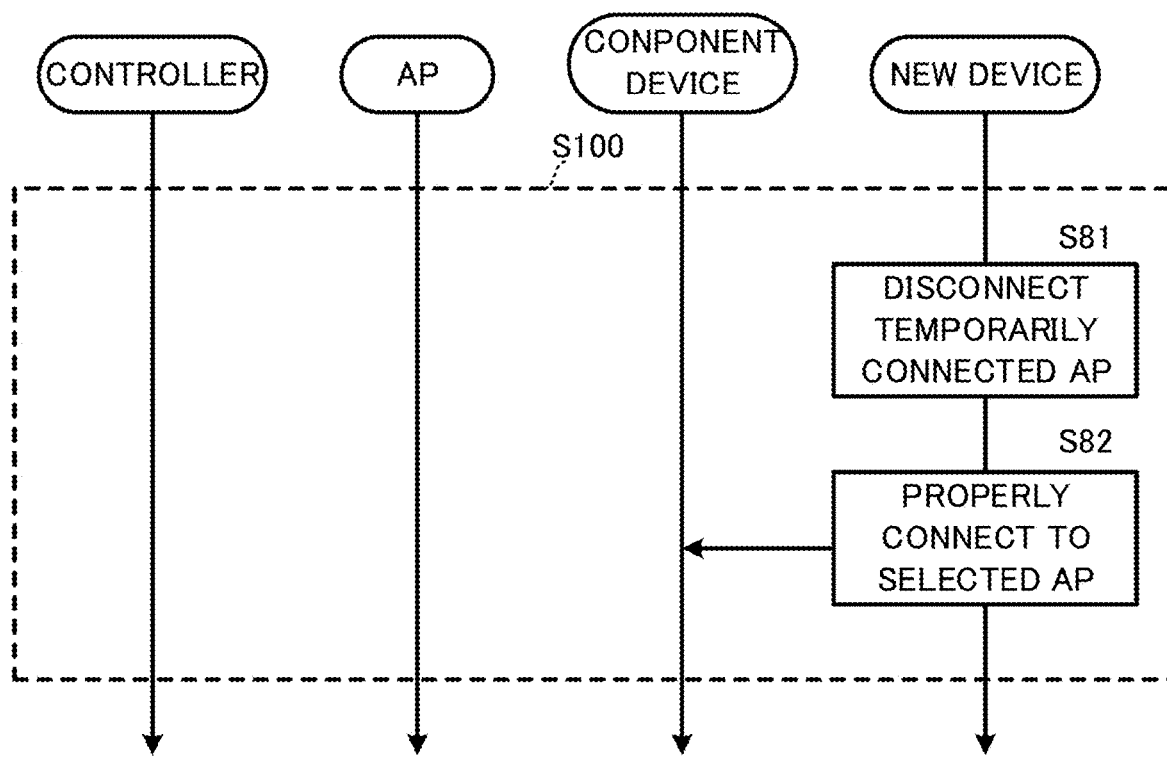
FIG. 9 is a diagram illustrating a communication procedure of the controller and the audio device.

FIG. 9 illustrates a communication procedure in a case where a new device disconnects the temporarily connected internal access point 4A in step S75 and reconnects to another internal access point 4A in a tree. The new device, when another internal access point 4A is selected as a proper connection destination in step S75 in FIG. 8, disconnects the currently temporarily connected internal access point 4A (S81), and properly connects to a selected internal access point 4A, using the address information of the system information (S82). Then, the new device proceeds to step S76 of FIG. 8.

FIG. 10 illustrates a communication procedure in a case where a new device disconnects the temporarily connected internal access point 4A in step S75 and reconnects to an external access point 3 as a branch device. The new device, when the external access point 3 is selected as a proper connection destination in step S75 in FIG. 8, disconnects the currently temporarily connected internal access point 4A (S91). Then, the new device starts a temporary access point only at the time of initial connection in stand-alone mode (S92). In other words, the new device starts an internal access point 4A that is not connected to the wired LAN 2 but rather connected only to the new device. The controller 1 previously stores the SSID and password of a temporary access point only at the time of initial connection. In other words, the SSID and password of the temporary access point only at the time of initial connection are previously written as data in the audio system control program 70. Therefore, the controller 1 detects the temporary access point only at the time of initial connection in the new device search started in Step S53, once releases connection with the external access point 3, and connects to a temporary access point that the new device has started (S83). The controller 1, since having a high possibility of being unable to obtain the SSID and password of the external access point 3 from the system program of the portable phone 1, asks a user to input the SSID and password of the external access point 3 in this step (S84). The SSID can be input by a method where a list of currently visible (connectable) destinations (SSID) is displayed and a user selects the SSID of the external access point 3. The password (usually shown on the main body of the external access point 3) is input by a user.

Then, the controller 1 transmits the connection information input by a user, to the new device that has started a temporary access point (S85). The new device receives the connection information input by a user (S93). The controller 1, after transmitting the connection information (SSID and password) of the external access point 3 to the new device, cancels connection with the temporary access point (S86). The new device, when receiving the connection information of the external access point 3 from the controller 1, stops the temporary access point (S94). The controller 1 reconnects to the external access point 3 of which the connection has once been released (S87). The new device connects to the external access point 3 using the obtained connection information (S95). Subsequently, returning to the procedure of FIG. 8, the controller 1 performs a new device search (S53), and a new device responds to the search (S76). It is to be noted that, in a case where the system information that has been obtained from the temporarily connected component device includes the connection information of the external access point 3, the processes (S83 to S87, S92 to S94) illustrated in step S101 can be omitted, and the new device can reconnect to an external access point as in FIG. 9.

Figure 13A:
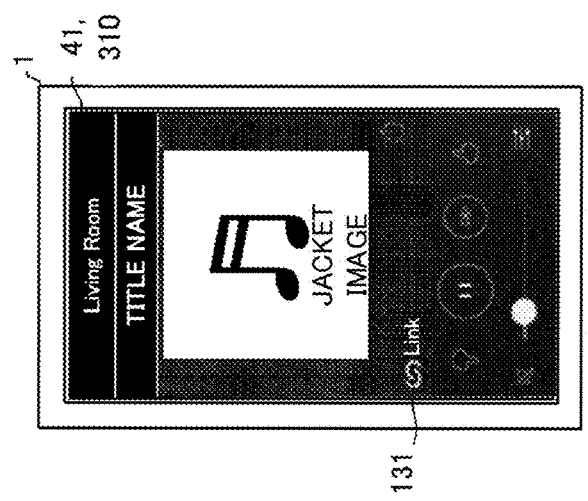
FIG. 13A illustrates an example of a control screen (room selection screen) of the portable phone.
Figure 13B:
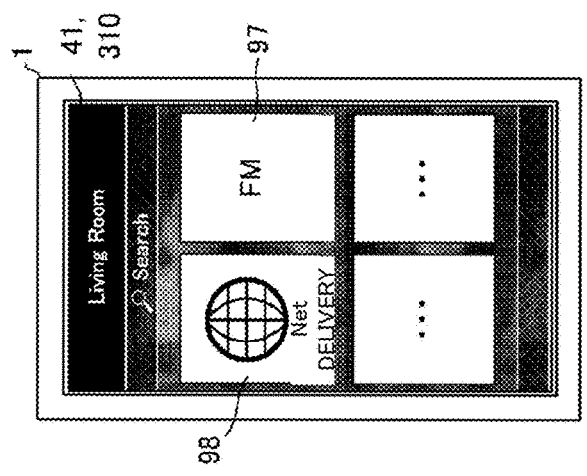
FIG. 13B illustrates an example of a control screen (source selection screen) of the portable phone.
Figure 13C:
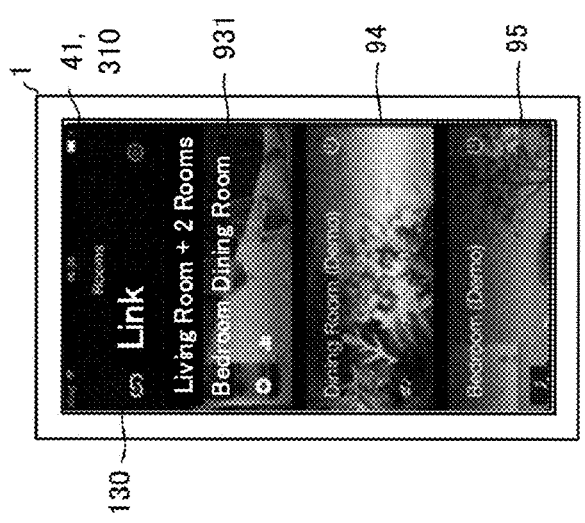
FIG. 13C illustrates an example of a control screen (play screen) of the portable phone.
Figure 14:
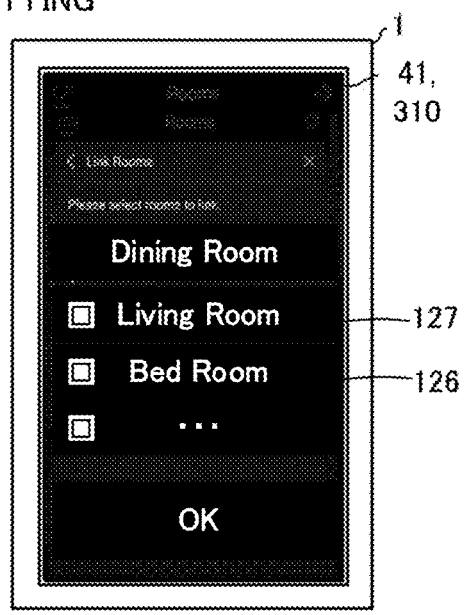
FIG. 14 illustrates an example of a control screen (client room selection screen) of the portable phone.
Figure 15:
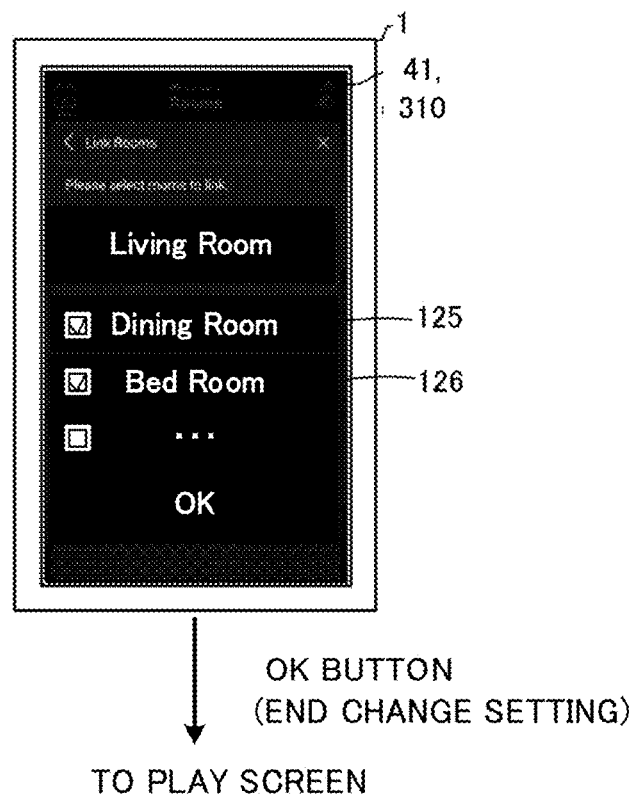
FIG. 15 illustrates an example of a control screen (client room selection screen) of the portable phone.

Subsequently, with reference to the control screen (display details of the display circuit 41) of the controller 1 (portable phone 1) in the audio system 10 illustrated in FIG. 11A to FIG. 15, a description will be made of a control procedure (playing procedure and group setting procedure) of one of the audio devices 4 using the controller 1. FIG. 11A to FIG. 11D each illustrate an example of a control screen at the time of play control. FIG. 12A and FIG. 12B each illustrate an example of a control screen at the time of group setting (first group setting) by the first procedure. FIG. 13A to FIG. 13C each illustrate an example of a control screen at the time of play control after the group setting. FIG. 14 illustrates an example of a control screen at the time of the group setting (second group setting) by the second procedure. FIG. 15 illustrates an example of a control screen at the time of group change setting.

Figure 11A:
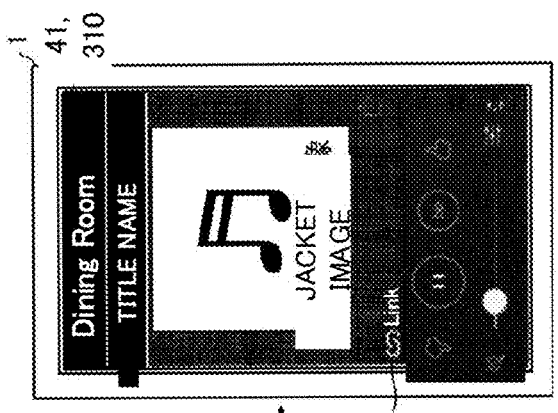
FIG. 11A illustrates an example of a control screen (initial menu screen) of the portable phone.

When the controller 1 is started, a control screen is displayed on the display circuit 41. First, an initial menu screen illustrated in FIG. 11A is displayed on the display circuit 41. When a user taps or selects a setup button 91, the controller 1 detects a tap operation by a touch panel 310 and starts the setup mode. In addition, when a user taps a system connection button 92, the controller 1 starts communicating with one of the audio devices 4 of the audio system 10. It is to be noted that, in the present preferred example, control is performed per room (area).

Figure 11B:
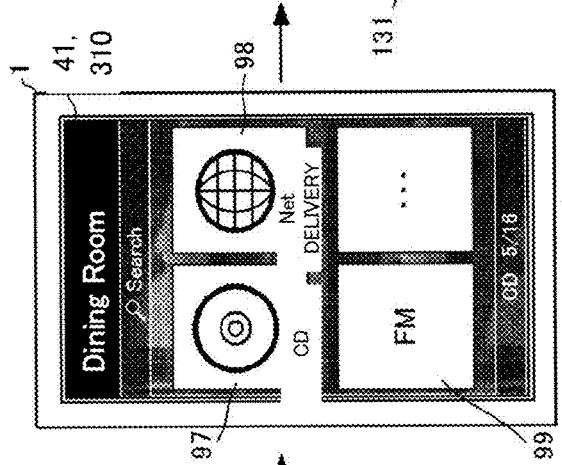
FIG. 11B illustrates an example of a control screen (room selection screen) of the portable phone.

A description will be made of a play procedure of causing the one of the audio devices 4 to play an audio source. When the communication between the controller 1 and the one of the audio devices 4 is started, the controller 1 (portable phone 1) displays a room selection screen (list screen) as illustrated in FIG. 11B, on a control screen (display circuit 41). The room selection screen displays a room selection button to select a room where the one of the audio devices 4 is installed. The room selection button has an image where the name of the room is displayed on a background image. In the example of FIG. 11B, three room selection buttons 93, 94, and 95 are displayed. The room selection button 93 is a button to select a living room. When a user selects the room selection button 93, the audio device 4-1 is selected. The room selection button 94 is a button to select a dining room. When a user selects the room selection button 94, the audio device 4-2 is selected. The room selection button 95 is a button to select a bed room. When a user selects the room selection button 95, the audio device 4-3 is selected. When a user operates (taps) any of the room selection buttons 93 to 95, one of the audio devices 4 in a tapped room is selected. It is to be noted that, in the example of FIG. 11B, the room selection buttons that are currently displayed on the control screen are three buttons 93 to 95. When a user scrolls the control screen by the touch operation, other room buttons displayed on the control screen can be displayed.

Figure 11C:
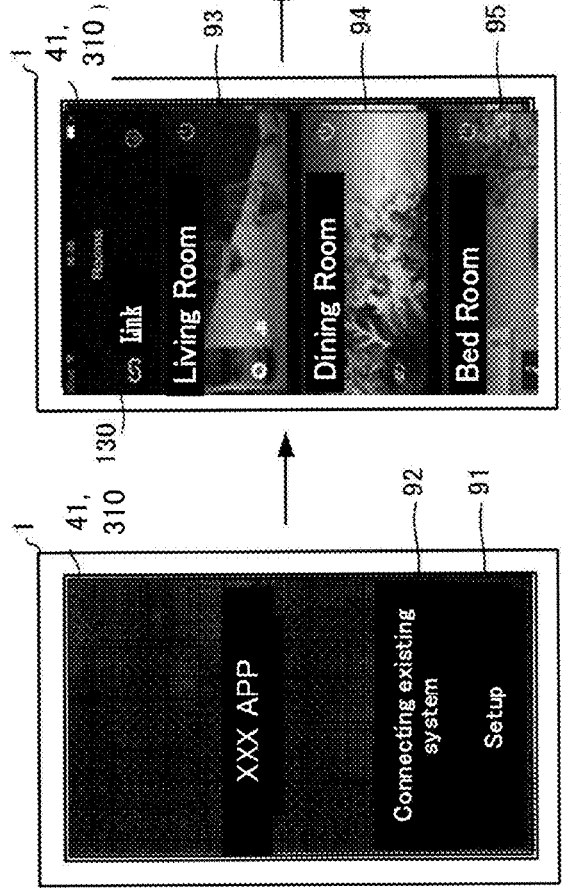
FIG. 11C illustrates an example of a control screen (source selection screen) of the portable phone.

When a user selects (taps) any of the room selection buttons, the controller 1 displays a source selection screen of a selected room. The controller 1, on the source selection screen, displays an icon button (source selection image) that illustrates a playable (serviceable) source of at least one of the audio devices 4 that is installed in the selected room. FIG. 11C illustrates the source selection screen when a dining room is selected by the tap of the room selection button 94. The source selection screen displays icon buttons 97, 98, and 99 that each illustrate a playable source of the audio device 4-3 that is currently installed in the dining room.

The icon button 97 is a button to select a CD. The icon button 98 is a button to select Net delivery by the delivery server 6. The icon button 99 is a button to select a FM broadcast (radio). When a user selects one of the icon buttons, a selected source is played.

For example, in FIG. 11C, when the icon button 97 is selected, the controller 1 transmits a command message to start playing a CD, to the audio device 4-3, and displays a play screen (currently play screen) (Now Playing screen) of a CD as illustrated in FIG. 11D. The screen displays an operation circuit such as a PLAY/PAUSE button and a volume slider. A user, when operating the operation circuits, can execute the play and stop of music (music data) of the CD, the volume control of the music, and the like. It is to be noted that FIG. 11D is an example of a control screen in a state where the group setting is not performed.

Subsequently, a description will be made of group setting for synchronously playing the same source in a plurality of rooms (audio devices 4). In the group setting, an audio device to be a master (master device) of a group and an audio device to be a client (client device) are selected. The group setting can include two types of group setting: the first group setting and the second group setting. To begin with, a description will be made of the first group setting with reference to FIG. 12A and FIG. 12B.

The first group setting is started when a link (Link) button 130 is selected on the screen of FIG. 11B. When the link button 130 is selected, a master room selection screen illustrated in FIG. 12A is displayed. The master room selection screen displays master room selection buttons 121 to 123 for selecting a master to be a supply source of an audio signal (audio source) that is synchronously reproduced (played) in a group. When the master room selection button 121 is operated, for example, on the screen, a living room is selected as a master room (master area), and the audio device 4-1 becomes a master of synchronous playing. It is to be noted that, while, in FIG. 12A, in the present example, only the three buttons 121 to 123 are displayed as master room selection buttons to facilitate understanding, the master room selection screen can display all buttons of a room that can be selected as a master.

When a master room is selected, a screen display is switched to a client room selection screen illustrated in FIG. 12B. The client room selection screen displays a client room selection button 125 and another client room selection button 126 for selecting another client of the group. When the client room selection button 125 or the client room selection button 126 is tapped, a check mark is displayed on a check box in the button that has been tapped and a checked item is in a selected state. FIG. 12B illustrates a state where both the client room selection button 125 and the client room selection button 126 have been tapped. In such a case, a check mark is displayed on the check box of both the client room selection button 125 and the client room selection button 126, and a dining room and a bedroom serve as a client room (client area), and the audio device 4-2 and the audio device 4-3 serve as a client.

After the above procedure, when the user operates a determination (OK) button, the group setting is thus completed. Then, the information related to a set group is registered in the audio control table illustrated in FIG. 5. In the audio control table illustrated in FIG. 5, like the example described above, information of a group (1A, 1B) where a master room is a living room (master: audio device 4-1), and client rooms are a dining room and a bedroom (client: audio device 4-2 and audio device 4-3) is registered. When a group is set up, the audio devices 4 that belong to the group synchronize and reproduce (play) the same audio signal (audio source). The audio source is played in the audio device (master device) serving as a master, and the audio signal is delivered from the master device to the audio device (client device) serving as a client. Thus, the audio source played in the group is limited to an audio source that the master device is able to play.

After completing a group setting operation, the controller 1 returns a display from the client room selection screen illustrated in FIG. 12B to the room selection screen. FIG. 13A illustrates an example of the room selection screen in a case where the group setting is present. When a group is set up, the group setting is also reflected in the room selection screen. In other words, in the example of FIG. 13A, the group setting of FIG. 5 is reflected in the room selection screen. In the example of FIG. 13A, the room name (Bed Room and Dining Room) of a client room is added to a room selection button 931 of the living room as a master room, and a blur can added to the background image of the room selection button 931 to make it easier for the user to see the setting. In addition, the room selection button 94 and the room selection button 95 of, respectively, the dining room and the bed room, which are client rooms, are grayed out and are not selectable. It is to be noted that the room selection button 94 and the room selection button 95 of a client need not be displayed (only the room selection button 931 of a master displayed) and made inoperable.

Then, when the room selection button 931 of a living room is selected on the room selection screen illustrated in FIG. 13A, the controller 1 displays the source selection screen of the audio device 4-1 being a master device, as illustrated in FIG. 13B. After a source is selected on the source selection screen of FIG. 13B, the controller 1 displays a play screen, as illustrated in FIG. 13C, of the audio devices 4-1 to 4-3 executing synchronous playing in a living room, a dining room, and a bedroom. It is to be noted that the control of synchronous playing can use application of a technique disclosed in Japanese Unexamined Patent Application Publication No. 2015-100085, for example.

Next, a description will be made of the second group setting with reference to FIG. 11A to FIG. 11D and FIG. 14. The second group setting is started when a link (Link) button 131 is selected on the screen of FIG. 11D. FIG. 11D illustrates a play screen (Now Playing screen) displayed while an audio source is being played in a room (one of the audio devices 4) that is not grouped. When the link button 131 is tapped on the Now Playing screen, the controller 1 proceeds to the second group setting (second procedure) where a selected room is set to a master room.

When the link button 131 is tapped on the play screen of the dining room illustrated in FIG. 11D, the controller 1 displays a client room selection screen on which the dining room illustrated in FIG. 14 is set to a master room. A user, on the client room selection screen, operates a client room selection button similarly to the first group setting illustrated in FIG. 12B, and selects a client room, and selects a determination (OK) button. Then, the setting of a group of which the room where the Now Playing screen illustrated in FIG. 11D is displayed is set to a master room is completed.

When the group setting in FIG. 14 is completed, playing in a single room continues until switched to playing in a set group. In other words, an audio source that is currently played in a single room (dining room, for example) is played in a group including a client room. Then, the display of the controller 1 is also switched to the play screen of a group (as illustrated in FIG. 13C, for example).

Thus, in the second group setting, when the audio source is played in a single room, the screen is directly switched to the group setting screen while the playing of the audio source can be continued, and the setting of a group, where the room during playing is set as a main room can be performed. When the group setting is completed, the audio source that has been playing in a single room is switched to be played (while being played) in a plurality of rooms (group).

In addition, in a case where the link button 131 is selected on the play screen (FIG. 13C, for example) of a room (master room) to which a group has been already set, the client room selection screen of the group to which the room corresponding to the play screen belongs is displayed, and the change setting (resetting and selecting) of a client room can be performed.

For example, in a case where the link button 131 is selected on the play screen of the living room illustrated in FIG. 13C where the master room is a living room and the client rooms are a dining room and a bed room, the controller 1 displays a client room selection screen as illustrated in FIG. 15. The controller 1 displays the setting details of the current group on the client room selection screen illustrated in FIG. 15. In other words, the controller 1 displays a state where a check icon is displayed on a check box corresponding to a dining room and a bedroom as a client room. A user can cancel (deselect) the display of the check icon with a touch operation of the client room selection button 125 or the client room selection button 126 when necessary, and can add a client room by newly performing a touch operation of another client room selection button. Then, the user selects the determination (OK) button to determine (complete the change setting of) the room (one of the audio devices 4) that belongs to a group. Subsequently, the controller 1 returns a display to the play screen of the living room illustrated in FIG. 13C. It is to be noted that the procedure of changing the setting of the group can be executed during playing of content.

Figure 16:
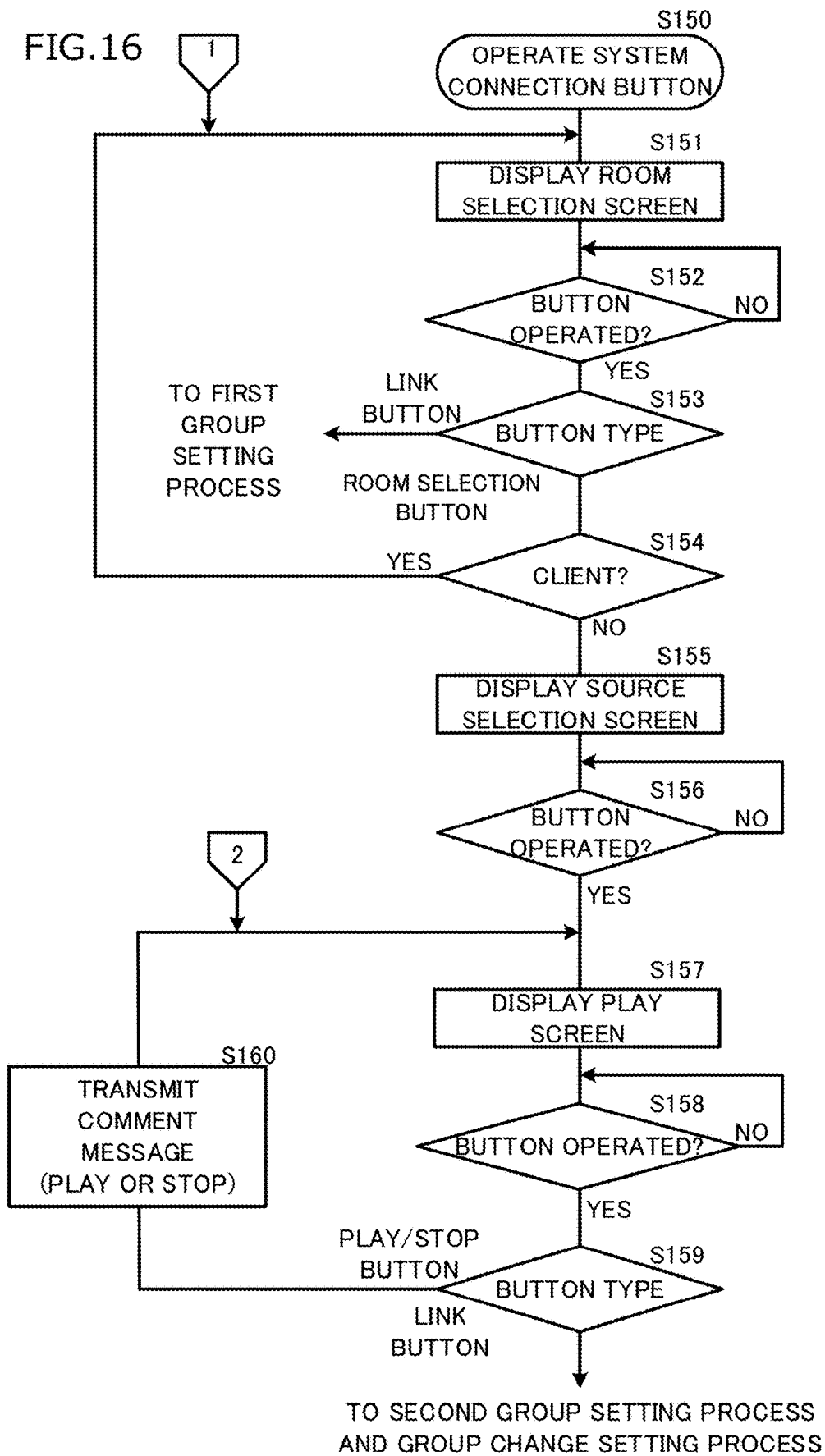
FIG. 16 is a flow chart illustrating a control process of a controller (control circuit).

A description will be made of a process operation of the controller 1 (control circuit 20) in the audio system 10 with reference to FIG. 16. When a user presses the system connection button 92 (S150), the process is started. It is to be noted that a partial process is omitted from the drawings.

The controller 1 causes the display circuit 41 to display a room selection screen indicating buttons to select a room, as illustrated in FIG. 11B and the like, mainly based on a system management table, an audio control table, and a room table (S151). Then, the controller 1 stands ready until any of the buttons is operated on the room selection screen (S152). The controller 1, when any of the buttons is operated on the room selection screen (YES in step S152), performs a process corresponding to an operated button (S153). The controller 1, when the link button 130 is operated, performs a first group setting process (see FIG. 17). In addition, the controller 1, when any of room selection buttons are operated, determines whether a room selected by the operation is a client room (S154). The determination is made with reference to the information of the group in the audio control table. When the room is a client room (YES in step S154), the controller 1 returns to the process of step S151. It is to be noted that, when the room selection button of a client is made inoperable without being displayed, the process of step S154 is unnecessary.

Alternatively, when the room is not a client room (NO in step S154), the controller 1 causes the display circuit 41 to display a source selection screen of the selected room as illustrated in FIG. 11C and the like (S155). Specifically, the controller 1 displays a source selection screen indicating various sources, mainly based on information of the service of the audio control table of an audio device corresponding to the selected room selection button, and a room table. Then, the controller 1 stands ready until an icon button of any of the sources is operated (S156). The controller 1, when an icon button is operated (YES in step S156), displays a play screen (FIG. 11D, for example) corresponding to a selected source (S157).

Then, the controller 1 stands ready until any of the buttons is operated on the play screen (S158). When any of the buttons is operated (YES in step S158) on the play screen, the controller 1 performs a process corresponding to an operated button (S159). In a case where the play/stop button is operated, the controller 1 transmits a command message of a playing process to the source that is currently selected, to one of the audio devices 4 corresponding to the room of the screen (S160), and returns to the process of step S157. Alternatively, in a case where the link button 131 is selected, the controller 1 performs the second group setting and a group change setting process (see FIG. 18).

Figure 17:
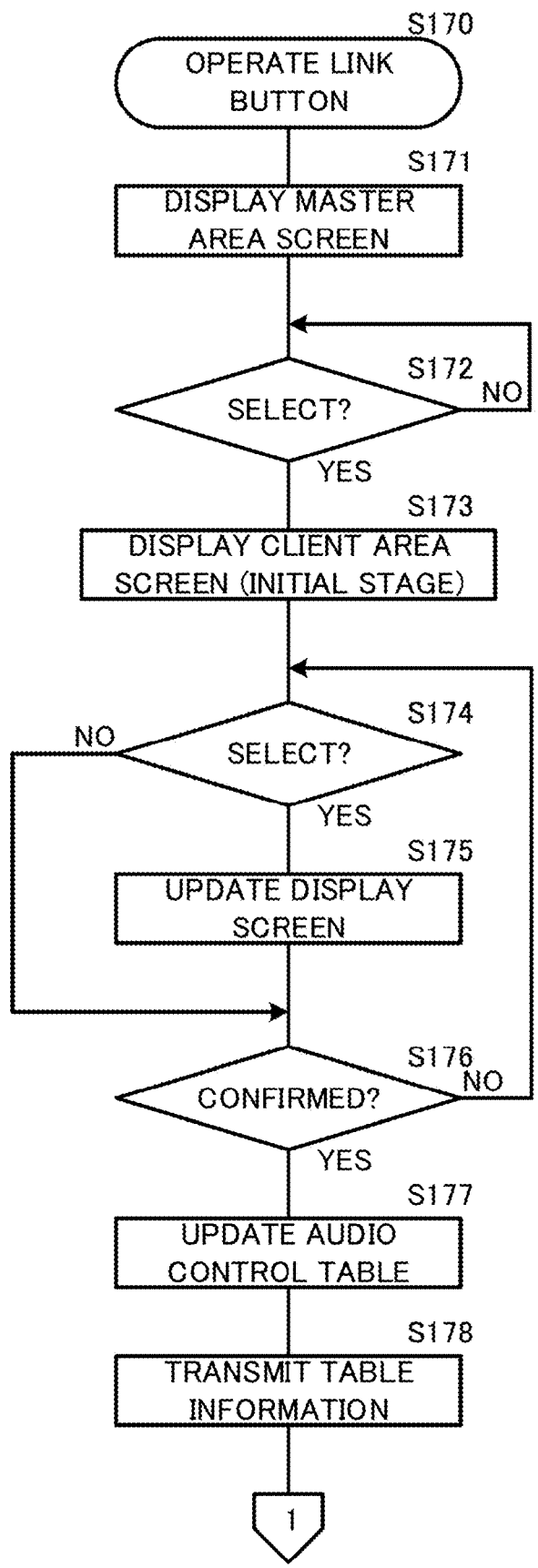
FIG. 17 is a flow chart illustrating a first group setting process of the controller (control circuit).

Subsequently, a description will be made of a first group setting process of the controller 1 in the audio system 10 with reference to FIG. 17. FIG. 17 is a flow chart illustrating the first group setting process of the controller 1 (control circuit 20). When a user presses the link button 130 on the room selection screen (S170), the process is started.

The controller 1 causes the display circuit 41 to display a master room selection screen as illustrated in FIG. 12A (S171), and stands ready until a master room is selected (S172). When a master room is selected (YES in step S172), the controller 1, as illustrated in FIG. 12B and the like, causes the display circuit 41 to display a client room selection screen corresponding to the selected master room (S173). At such a time, the client room selection screen displays a client room selection screen in the initial state where a check mark is not displayed on a check box.

Then, the controller 1, every time a client room is selected (YES in step S174), updates the display of the client room selection screen (S175). In other words, the controller 1 updates a screen so that a check icon can be added to the check box of the selected room. In addition, the controller 1, when finding a check icon in the check box of the selected room, updates the screen so that a check icon can be deleted. Then, the controller 1 repeats and executes the processes of S174 and S175 until the OK button is pressed to determine the selection (S176). When the selection is determined (YES in step S176), the controller 1 updates the audio control table based on a selection result (S177).

Subsequently, the controller 1 transmits the updated audio control table to all the audio devices 4-1 to 4-6 that can communicate (S178). Accordingly, each of the audio devices 4-1 to 4-6 can perform synchronous playing by obtaining the information of whether the device belongs to a group and the information of whether the device is a master of synchronous playing. Then, the controller 1 proceeds to the process of step S151 illustrated in FIG. 16, and displays a room selection screen. In such a case, as illustrated in FIG. 13A, the information of the group updated in step S177 is reflected in the room selection screen.

A description will be made of the second group setting and a group change setting process of the controller 1 in the audio system 10 with reference to FIG. 18. FIG. 18 is a flow chart illustrating the second group setting and the group change setting process of the controller 1 (control circuit 20). When a user presses the link button 131 on the play screen (S200), the process is started.

The controller 1 determines whether a room corresponding to the play screen already belongs to a group (S201). Specifically, the controller 1 makes a determination based on the information of the group of the audio control table. When the room does not belong to a group (NO in step S201), the controller 1 determines that the setting is the second group setting, omits the processes of the master room selection screen displayed by the first group setting, and causes the display circuit 41 to display the client room selection screen where the room corresponding to the play screen as illustrated in FIG. 14 is set to the master room (S202). At such a time, the controller 1 displays a client room selection screen in the initial state where a check mark is not displayed on a check box, as the client room selection screen. Then, the controller 1 performs the processes of steps S203 to S207 that are similar processes to steps S174 to S178.

According to the second group setting, a group of which the room corresponding to the play screen is set to a master room is set up.

On the other hand, in a case where the room already belongs to the group (YES in step S201), the controller 1 determines that the setting is the group change setting, and causes the display circuit 41 to display a client room selection screen as illustrated in FIG. 15 and the like (S202). At such a time, the details of the setting of the current group are displayed on the client room selection screen. In other words, the controller 1 displays a check mark on a check box corresponding to the area or the room that belongs to a group. Subsequently, the controller 1 performs the above described processes of steps S203 to S207.

The change setting changes the setting of the client room that belongs to the group of which the room corresponding to a play screen is set to a master room. In addition, the controller 1 executes the process of step S207, and then proceeds to the process of step S157 illustrated in FIG. 16 and displays the play screen of the master room.

As described above, in the second group setting, through a procedure simpler than the procedure of the first group setting process, the group setting can be performed. Moreover, since, in the second group setting, play content has already been determined, it would prevent mistakes of controlling the content shared in a group or there would not be any need to determine or select content as a process after the group setting.

It is to be noted that, while switching from the play screen to a second group setting is permitted, switching from any stages of the procedure to the second group setting procedure, can be permitted, as long as a room (area) is selected on the room selection screen. For example, the link button 131 is provided on the source selection screen to make it possible to switch to the second group setting.

In addition, on the room selection screen (FIG. 13A) where the group setting has been reflected, the client room selection button 94 and the client room selection button 95 are grayed out and are not operable. Alternatively, the client room selection button 94 and the client room selection button 95 need not be displayed so that only the room selection button 931 of a master is displayed.

Moreover, while, in the above described example, one audio device is installed in one room, a plurality of sets of audio devices can be installed in one room. In such a case, when the plurality of sets of audio devices are installed in the master room, one of the plurality of sets of audio devices according to the number of HOPs, for example, can be set up as a master of synchronous playing.

In addition, the system management table, the audio control table, and the like can be automatically generated at the time of the network connection of the audio device. Also, for example, a user can directly input required information mainly to the controller 1.

Furthermore, in the above described example, a description has been made of the configuration where only an audio device that functions as a master of synchronous playing is used. But as long as at least one audio device that functions as a synchronous playing master is included in the audio system, an audio device that does not function as the master of synchronous playing can be included.

In addition, while, in the above described example, the room selection screen is mainly displayed to perform the selection and group setting of an audio device that executes playing per room (area), the setting can be performed per audio device. In such a case, the display of room names, such as a room selection screen can be displayed under the name of an audio device.

It is to be noted that the present invention can be applicable to a content player, such as an audio visual (AV) device with a video play function. Indeed, the present invention can be applied to a system where an audio device and an AV device are mixed. In addition, the present invention is also applicable to a device that performs a predetermined operation, other than a content player. Moreover, the control terminal is achieved by the portable phone 1 where the audio system control program 70 (application program) is installed, the control terminal can be achieved by a configuration other than the portable phone. For example, the control terminal can be a tablet where the audio system control program 70 is installed or can be an exclusive terminal device.

The foregoing description is merely illustrative and should not be construed to limit the present invention. The scope of the present invention is thus defined by the claims. Further, the scope of the present invention is intended to include all modifications within the scopes of the claims and within the meanings and scopes of equivalents.

What is claimed is:

1. A control terminal for controlling grouping of a plurality of audio devices in a content-playback system connected via a network, the control terminal comprising:
    at least one memory storing instructions; and
    at least one processor configured to implement the stored instructions and execute a plurality of tasks, including:
        a receiving task that receives a first selection of a first audio device already connected as a root or node device in the network and already is included in a previously set group, from among the plurality of audio devices, and a group setting operation for the first audio device; and
        a group setting task that creates a new group that includes the first audio device upon receiving the group setting operation, wherein the new group setting task:
            receives a second selection of at least a second audio device other than the first audio device, from among the plurality of audio devices, as a client device, to cause the first audio device to be set as a master device; and
            generates a group setting for the new group that includes the first audio device and at least the second audio device that synchronizes with the master device for playing predetermined content,
            wherein in a case where the second audio device is a new device that is connected as a root or node device, the second audio device starts an internal access point in a stealth mode; and
        a play task that instructs:
            the first audio device as the master device to play the predetermined content; and
            the second audio device as the client device to receive the predetermined content that the first master device plays and then to synchronously play the predetermined content with the master device.

2. The control terminal according to claim 1, wherein at least the second audio device as the client device includes at least one of any previously selected audio device other than the first audio device.

3. The control terminal according to claim 2, wherein each of the plurality of audio devices is a content player.

4. The control terminal according to claim 3, wherein the play task, in a state where the first audio device is playing the predetermined content when the receiving task receives the group setting operation, causes the predetermined content to be continuously played, even while the group setting task is being performed.

5. The control terminal according to claim 4, further comprising:
    a user interface configured to receive at least one user instruction from a user,
    wherein the user interface includes a display device, and
    wherein the plurality of tasks include a display control task that controls the display device, while the first audio device is playing the predetermined content, to display a currently playing screen indicating that the predetermined content is being played on the display device.

6. The control terminal according to claim 5, wherein the display control task controls the display device, in a state where the group setting task is being performed while the first audio device is playing the predetermined content, to display a selection screen indicating that the client device is being selected.

7. The control terminal according to claim 6, wherein the display control task controls the display device to resume displaying the currently playing screen when the grouping setting task ends.

8. The control terminal according to claim 6, wherein the display control task controls the display device to display a selection image for switching to the selection screen on the currently playing screen.

9. The control terminal according to claim 6, wherein the selection screen displays a selection of at least one client device that synchronizes with the master device corresponding to the currently playing screen.

10. The control terminal according to claim 3, wherein the predetermined content includes audio.

11. A method of controlling a control terminal for grouping a plurality of audio devices in a content-playback system connected via a network, the method comprising:
    receiving a first selection of a first audio device already connected as a root or node device in the network and already is included in a previously set group, from among a plurality of audio devices, and a group setting operation for the first audio device;
    creating a new group that includes the first audio device upon receiving the group setting operation by:
        receiving a second selection of at least a second audio device other than the first audio device, from among the plurality of audio devices, as a client device, to cause the first audio device to be set as a master device; and
        generating a group setting for the new group that includes the first audio device and at least the second audio device that synchronizes with the master device for playing predetermined content,
        wherein in a case where the second audio device is a new device that is connected as a root or node device, the second audio device starts an internal access point in a stealth mode;
    causing the first audio device as the master device to play the predetermined content; and
    causing the second audio device as the client device to receive the predetermined content that the first master device plays and then to synchronously play the predetermined content with the master device.

12. The method according to claim 11, wherein at least the second audio device as the client device includes at least one of any previously selected audio device other than the first audio device.

13. The method according to claim 12, wherein each of the plurality of audio devices is a content player.

14. The method according to claim 12, wherein, in a state where the first audio device is playing the predetermined content when the receiving stcp receives the group setting operation, causing the predetermined content to be continuously played, even while the creating is being performed.

15. The method according to claim 14, wherein:
the control terminal includes a user interface configured to receive at least one user instruction from a user,
the user interface includes a display device, and
the method further comprises controlling the display device, while the first audio device is playing the predetermined content, to display a currently playing screen indicating that the predetermined content is being played on the display device.

16. The method according to claim 15, wherein the display controlling controls the display device, in a state where the creating is being performed while the first audio device is playing the predetermined content, to display a selection screen indicating that the client device is being selected.

17. The method according to claim 14, the display controlling controls the display device to resume displaying the currently playing screen when the creating ends.

18. The method according to claim 14, wherein the display controlling controls the display device to display a selection image for switching to the selection screen on the currently displaying screen.

19. The method according to claim 16, the selection screen displays a selection of at least one client device that synchronizes with the master device corresponding to the currently playing screen.

20. The method according to claim 13, wherein the predetermined content includes audio.

* * * * *